April 7, 1936.  A. T. BREMSER  2,036,253
INTERNAL COMBUSTION ENGINE
Filed May 23, 1933  8 Sheets-Sheet 1
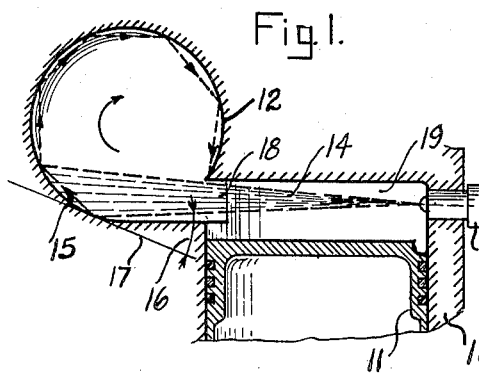
Fig. 1.
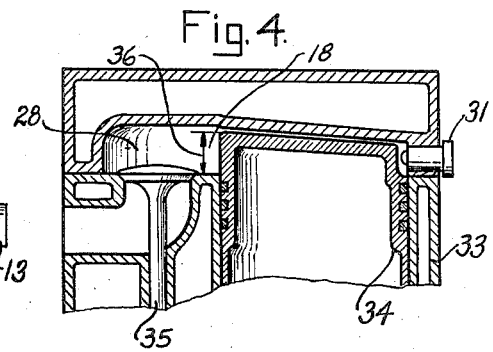
Fig. 4.
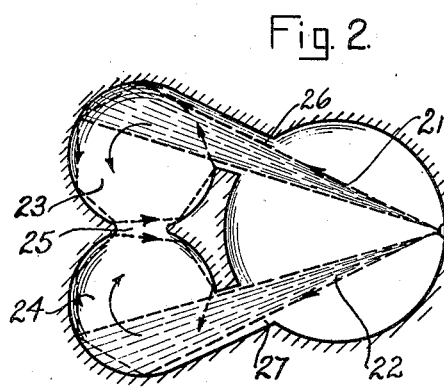
Fig. 2.
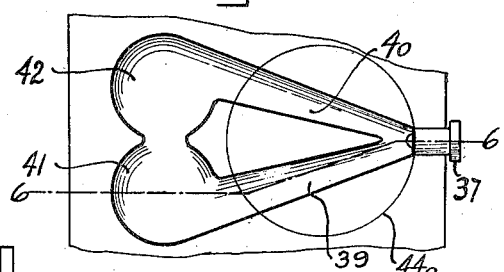
Fig. 5.
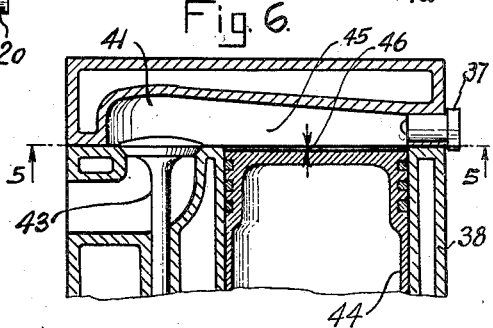
Fig. 6.
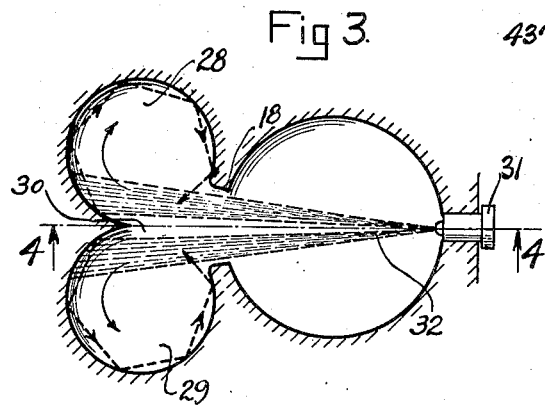
Fig. 3.
INVENTOR.
Albert T. Bremser
BY
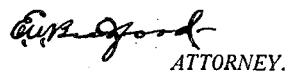
ATTORNEY.

April 7, 1936.   A. T. BREMSER   2,036,253
INTERNAL COMBUSTION ENGINE
Filed May 23, 1933   8 Sheets-Sheet 2

INVENTOR.
Albert T. Bremser
BY
ATTORNEY.

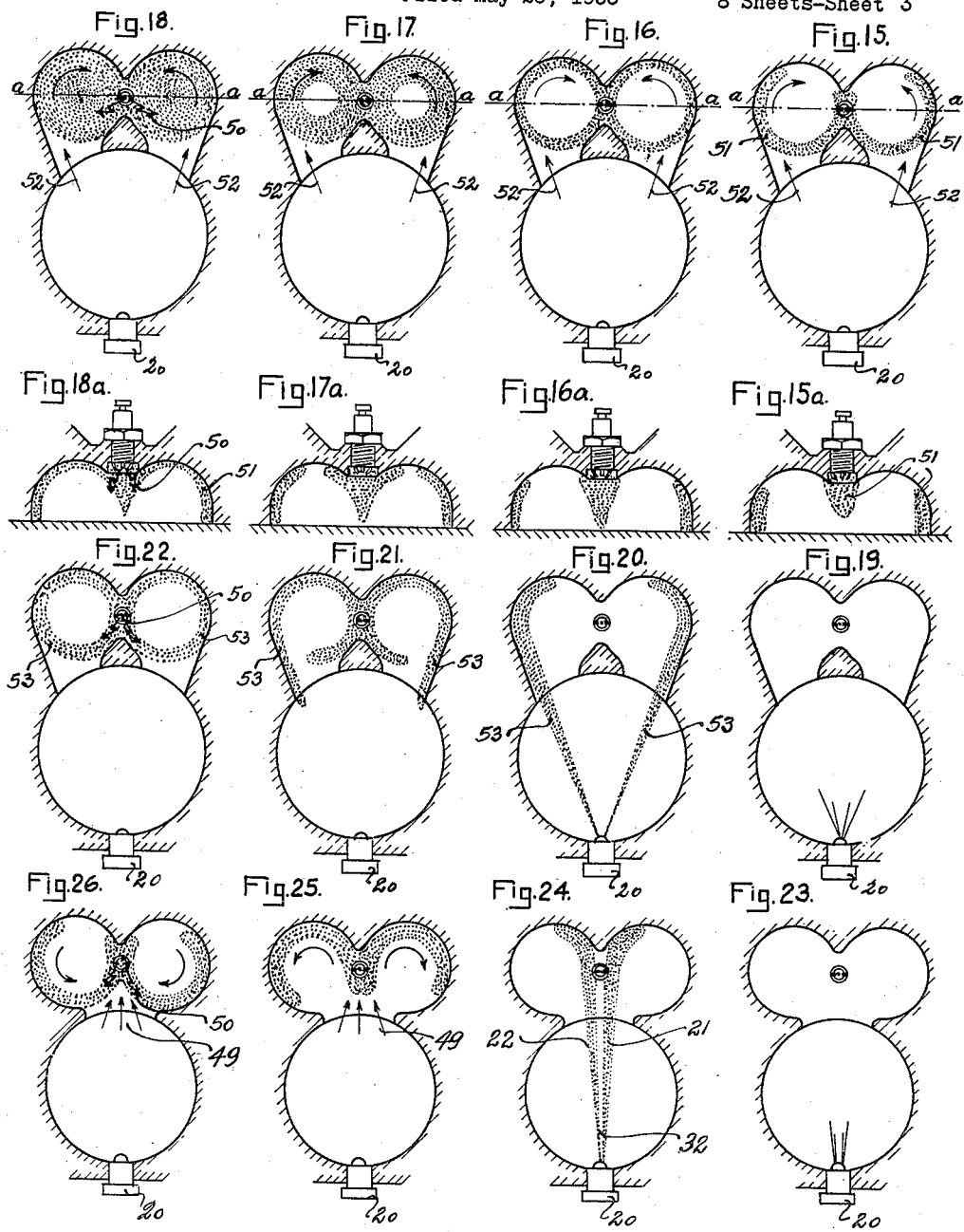

April 7, 1936.　　　　A. T. BREMSER　　　　2,036,253
INTERNAL COMBUSTION ENGINE
Filed May 23, 1933　　　8 Sheets-Sheet 4
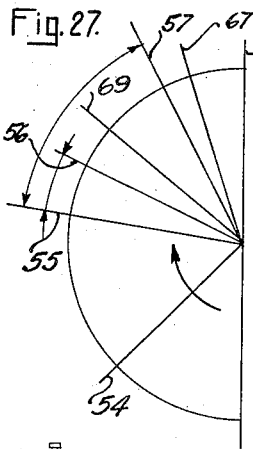
Fig. 27.
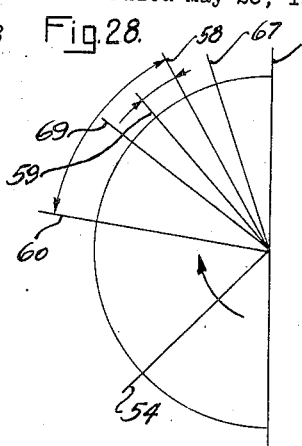
Fig. 28.
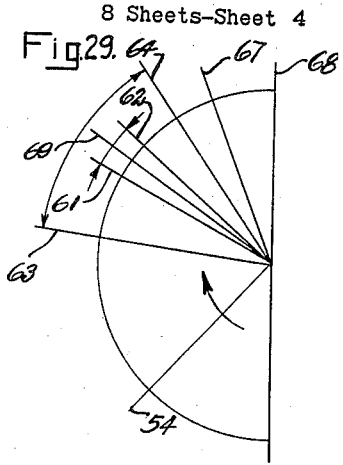
Fig. 29.
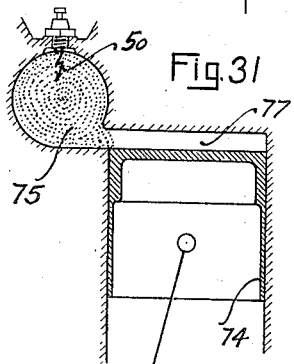
Fig. 31.
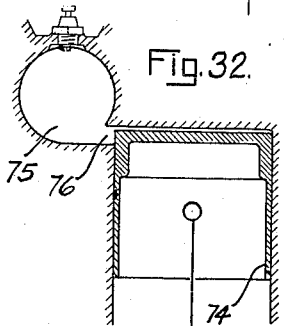
Fig. 32.
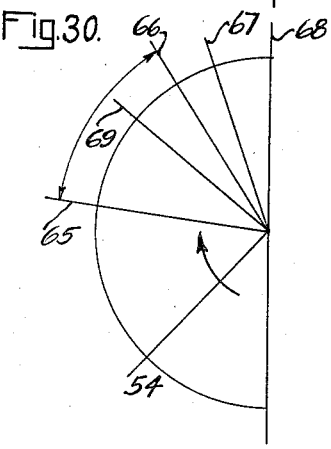
Fig. 30.
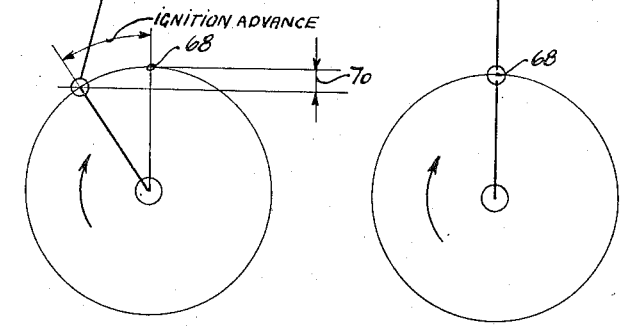
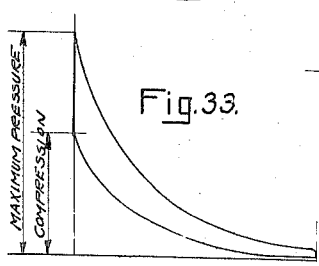
Fig. 33.
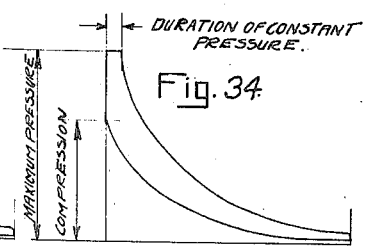
Fig. 34.
INVENTOR.
Albert T. Bremser
ATTORNEY.

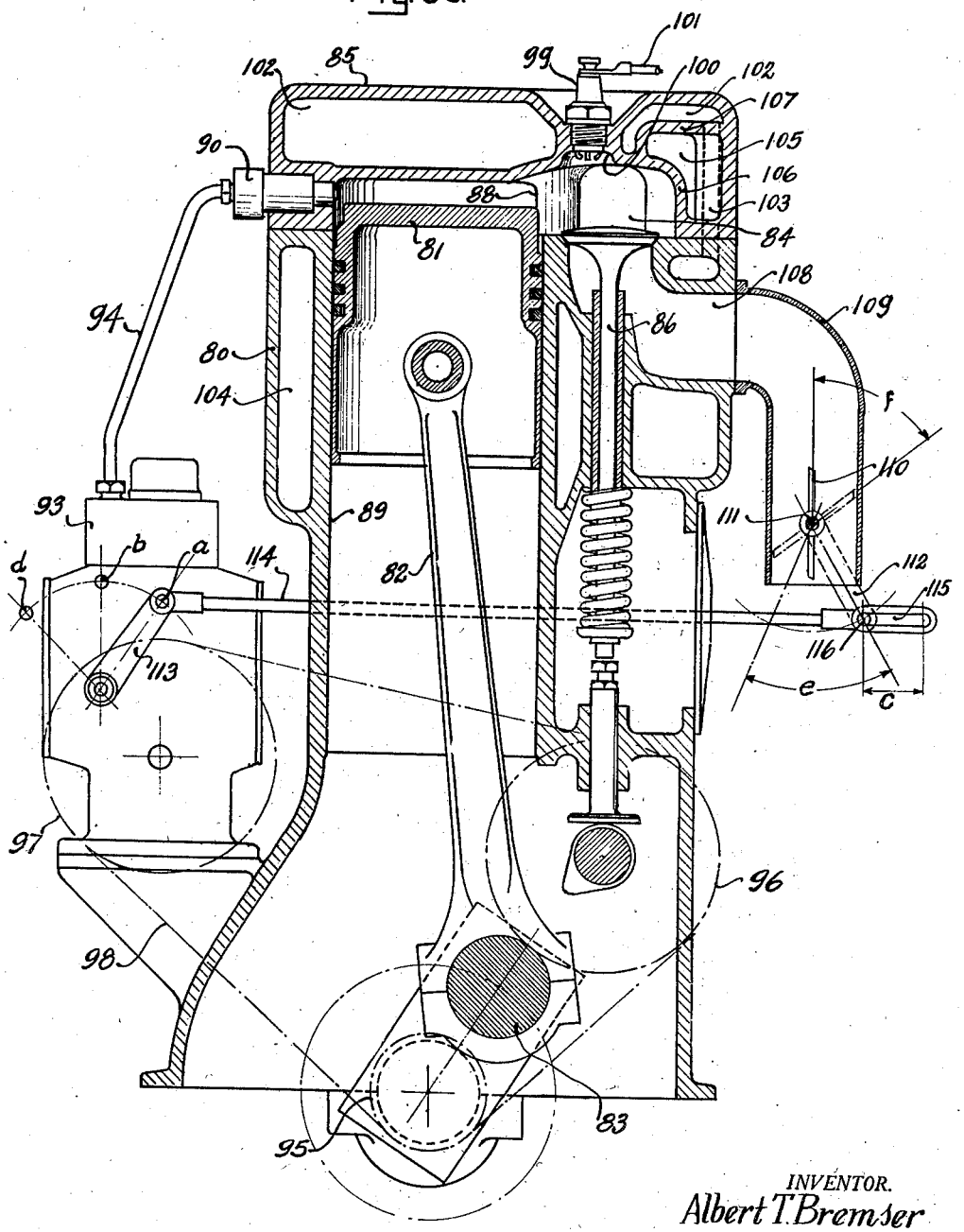

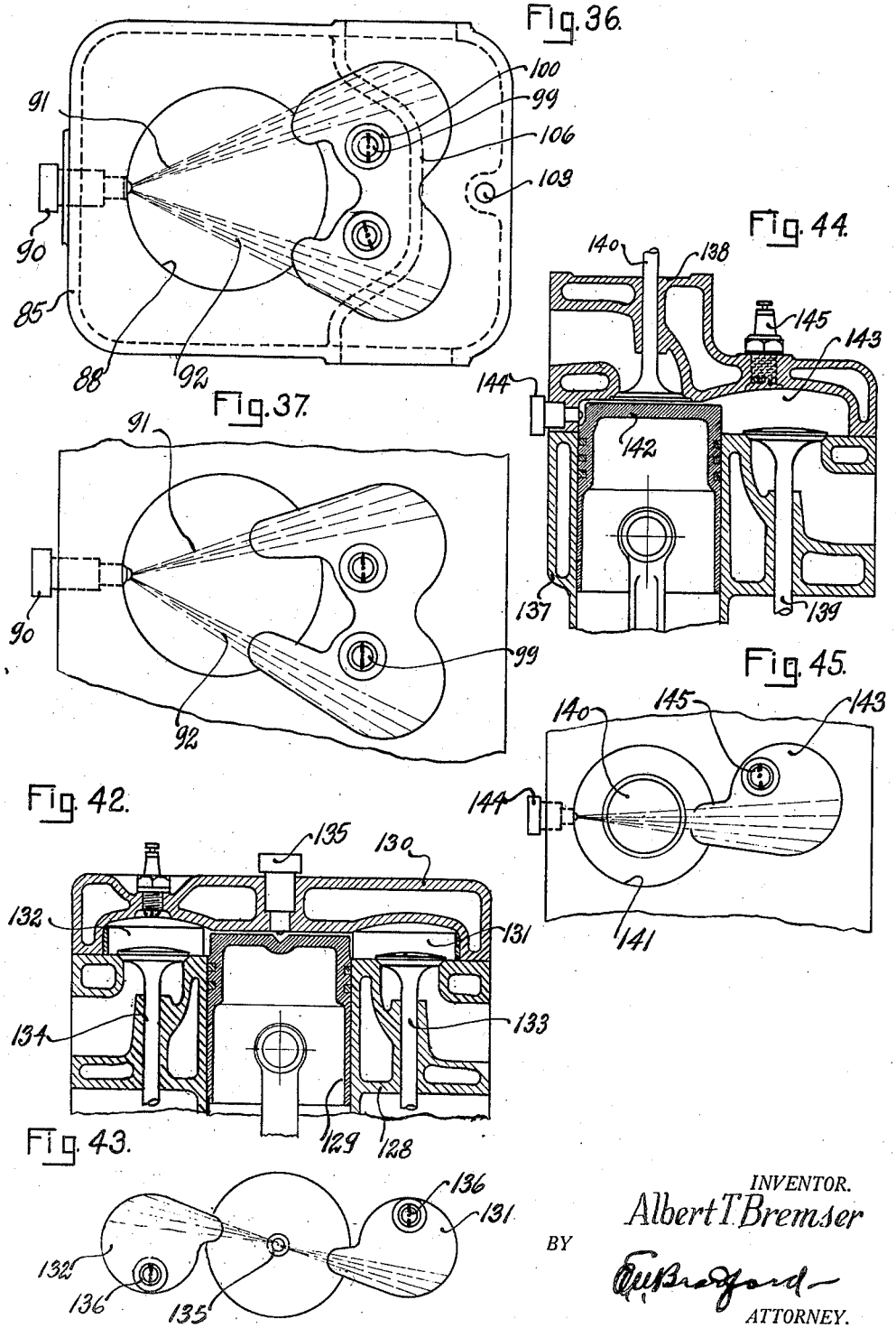

April 7, 1936. A. T. BREMSER 2,036,253
INTERNAL COMBUSTION ENGINE
Filed May 23, 1933 8 Sheets-Sheet 7
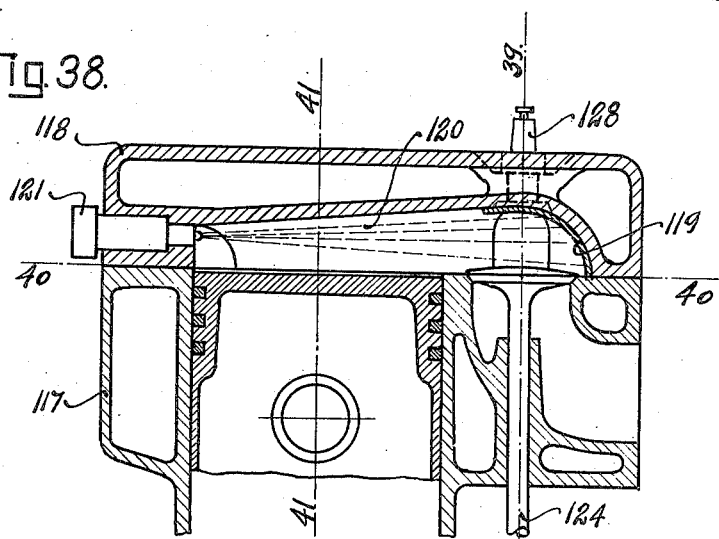
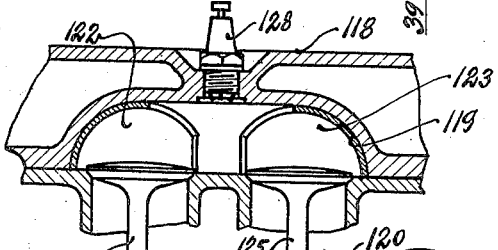
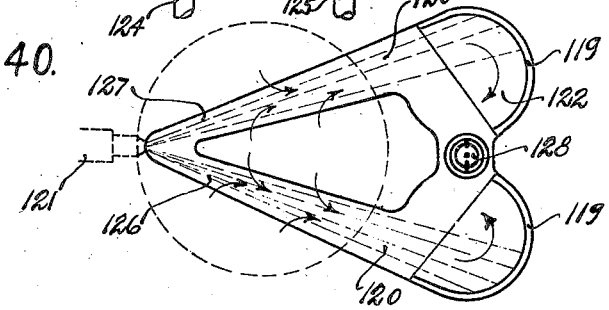
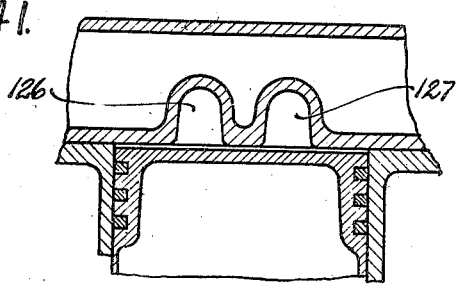
INVENTOR.
Albert T. Bremser
BY
ATTORNEY.

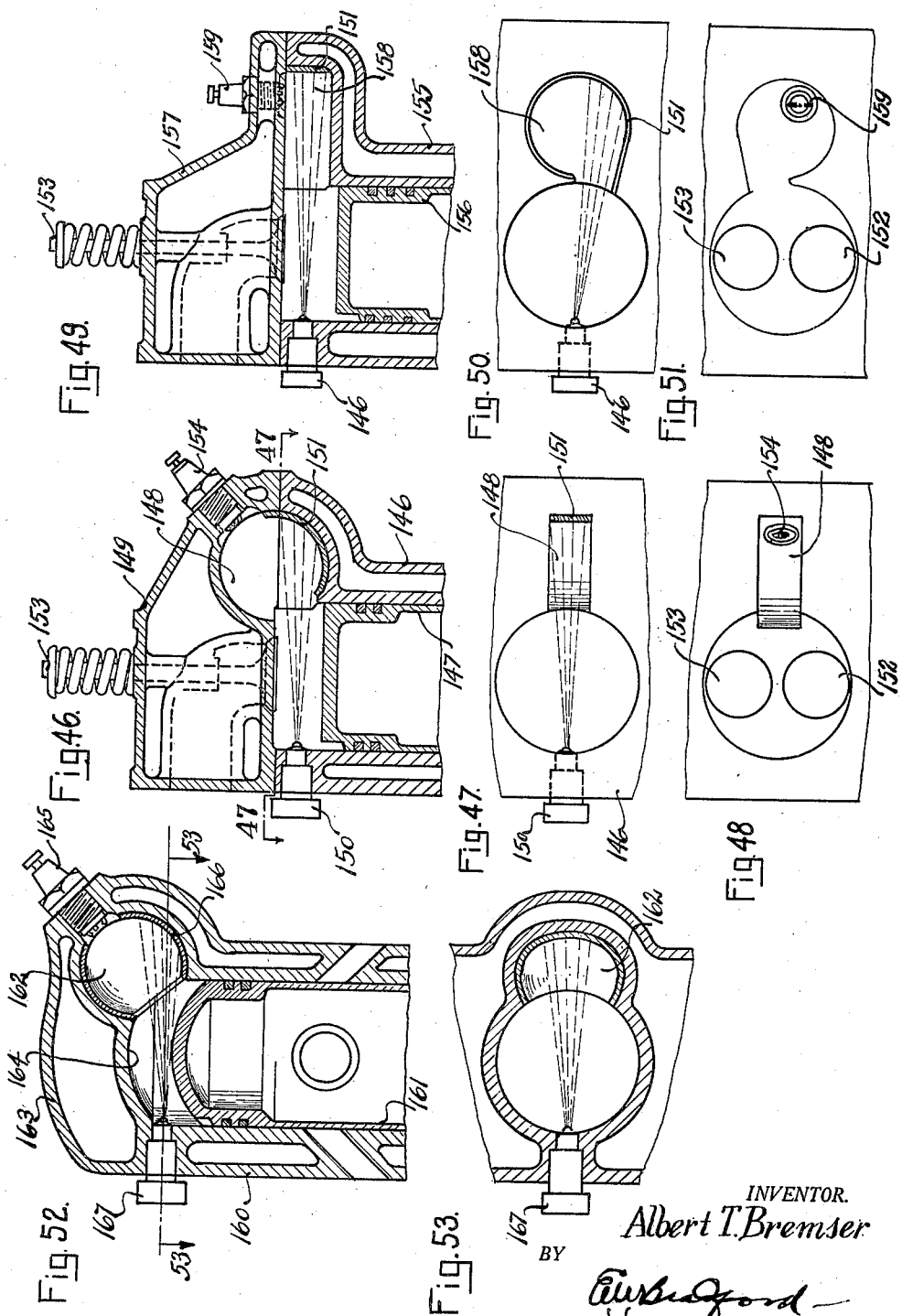

Patented Apr. 7, 1936

2,036,253

UNITED STATES PATENT OFFICE 2,036,253

INTERNAL COMBUSTION ENGINE

Albert T. Bremser, Westmont, N. J.

Application May 23, 1933, Serial No. 672,485

50 Claims. (Cl. 123—32)

My invention relates to internal combustion engins and more particularly to low compression engines employing ignition apparatus to effect artificial ignition. By low compression engines is meant engines in which there is employed a compression ratio which will not produce self ignition of the fuel charge when the engine is in operation. By the term artificial ignition is meant ignition due to some external energy which is under such control that ignition of the charge in the cylinder may be caused to occur at any predetermined moment in the engine cycle.

An object of my invention is to form a combustible charge of fuel and air in a low compression engine and ignite this charge by means of an artificial ignition system in such a manner as to enable heavy and non-volatile fuels to be burned in such engines under widely varying conditions of speed and load and at the same time to obtain most efficient results in the fuel consumed in terms of power output per cubic inch of cylinder displacement for a given fuel.

Another object is to provide a method of engine operation which at all loads will provide a predetermined amount of pure air in the cylinder which air will be caused to enter the combustion chamber after ignition of the fuel and air charge has set in to effect a complete combustion of the heavy components of the fuel charge.

A further object is to provide apparatus by which all of the above stated methods may be carried out.

In describing my invention it seems advisable first to explain at length the method and then to describe in detail one or more forms of apparatus by which the method may be practiced.

Explanation of the process

In order to use liquid hydrocarbons as fuel for the operation of internal combustion engines of the type referred to, it is necessary to convert the liquid fuel into a dry vapor and this vapor must be mixed with sufficient air to effect complete combustion. In order to vaporize the liquid fuel during the short time available for the vaporization, the fuel must be broken up into very fine particles. This is done by forcing it through a spray nozzle under high pressure whereby the liquid takes the form of very fine spray particles referred to as droplets. Since the pressure at which the fuel is forced through the spray nozzle is on the order to 1000 to 4000 pounds per square inch and higher it is evident that the kinetic energy imparted to the fuel droplets is very great. In engines of the type referred to which are of known construction this large amount of kinetic energy causes the cloud of fuel droplets to scatter all over the cylinder and combustion chamber, and therefore produces at light engine loads and no load or idling a fuel air mixture too lean to be ignited safely and not uniform enough to be burned efficiently.

My method of charge formation utilizes the kinetic energy of the fuel droplets to maintain an uninterrupted fuel cloud at all engine loads and speeds, to place this fuel cloud into the vicinity of the ignition point and to prevent the fuel from being diffused throughout the entire air in the combustion chamber at part loads and no load condition of the engine.

In my invention an atmosphere of pure air is provided in the cylinder and combustion chamber of an engine of the type referred to. The air in the combustion chamber is termed as an isolated portion of predetermined and fixed volume of the entire air charge. This fixed volume is equal or nearly equal to the compression volume. Liquid fuel is sprayed through the atmosphere of air contained in the cylinder during the compression stroke of the engine. The temperature of this air at this time is much higher than that of the fuel and in passing through the air the fuel droplets will absorb some of the heat of the air and this will tend to vaporize the outer surface of the fuel droplets and envelop them in a film of fuel vapor, which will act as an elastic cushion.

After passing through the air in the cylinder in an unobstructed manner the fuel droplets enveloped in a vapor jacket will enter the isolated portion of pure air in the combustion chamber and will strike against the hot walls of the combustion chamber at an oblique angle and will be deflected at approximately the same angle and continue to strike the walls of the chamber and continue to be deflected until their kinetic energy is spent or until they are completely vaporized. The vapor jacket around the fuel droplets will prevent them from wetting the walls of the combustion chamber. The walls of the combustion chamber are heated very hot by the combustion gases and the action of the fuel droplets when striking against and bounding off the walls is not unlike the action of droplets of water upon a hot stove or hot plate. Furthermore the fuel droplets are caused to enter the combustion chamber in such a manner that they will travel about the combustion chamber in the same general direction of rotation and since all the droplets are traveling at the same rate of velocity the entire charge of fuel will at all times during the process of the charge formation form an uninterrupted fuel cloud.

In the foregoing description the effect of the air in the engine cylinder and the combustion chamber upon the fuel jet has not been fully explained. The fuel jet leaves the spray nozzle at a velocity of several hundred feet per second, which, at full engine speed, may be 800 to 1000 feet per second. Since the air in the engine cylinder is comparatively still it is evident that the impact of the fuel jet upon the air will cause spreading of this jet in diameter. Air will mix with the fuel and will be carried along by the fuel, so that when the fuel jet reaches the passage connecting the combustion chamber with the cylinder, the fuel will be partly mixed with air. It is evident that if the air resistance which the fuel jet has to overcome would continue after it has reached the entrance of the combustion chamber, the fuel jet would continue to spread in diameter and the fuel air mixture would finally become so lean that ignition at part load would be doubtful. If, however, the air resistance is eliminated or reduced, the fuel jet will not continue to spread. This is effected by imparting a predetermined velocity to the air, when passing from the cylinder, through the passage into the combustion chamber. The drawings indicate that this passage is restricted. It may be compared with the venturi of a carburetor or the riser tube of the inlet manifold of a single cylinder gasolene engine. Fuel and air are mixed in the Venturi and riser tube and a similar action takes place in the passage referred to, which may be termed Venturi or mixing passage. In passing through this passage additional air will be entrained with the fuel jet, so that a combustible fuel-air mixture enters the combustion chamber proper. This fuel-air mixture will be termed fuel cloud. It has been stated that in order to prevent further spreading of this fuel cloud the air resistance must be reduced or eliminated. The Venturi passage is suitably arranged with respect to the combustion chamber and the engine cylinder to direct the air in the direction of travel of the fuel jet and fuel cloud. The cross sectional area of this passage, and the piston velocity determine the velocity of the air. This velocity is a function of the engine speed, and can be several hundred feet per second. It will be evident to those skilled in the art, that, if fuel injection takes place during a certain predetermined interval of the compression stroke of the engine the velocity of the fuel jet, at the time it enters the passage and the air velocity in that passage can be equal or nearly equal, so that the air resistance upon the fuel jet is eliminated or reduced. The air velocity will decrease during the second half of the compression stroke, since the piston velocity decreases and since the air spends its kinetic energy and the velocity of the fuel cloud will likewise decrease, since it spends its kinetic energy while traveling about the walls of the combustion chamber. Therefore it may be stated, that if the velocities of the fuel cloud and of the air are the same or nearly the same at one instant, while they rotate in the combustion chamber, they will not change relative to each other during the entire time interval which elapses until ignition occurs. Elimination or material reduction of the air resistance prevents continued spreading of the fuel cloud, and elimination or material reduction of the relative velocity between the fuel cloud and the air prevents excessive diffusion of the fuel throughout the relatively pure air in the combustion chamber at part load condition of the engine. As the cloud of fuel droplets rotates and contacts the heated walls of the combustion chamber and also by absorbing the heat from compression it is converted into a cloud of dry vapor and is being ignited when it is in the vicinity of the spark plug. The process of charge formation explained in the foregoing description represents the first one of two variations of the method of charge formation.

The second variation proposes to form a localized uninterrupted cloud of fuel vapor in substantially the same manner as set forth in the first variation with the exception that the velocity of the air entering the combustion chamber is substantially increased during the latter part of the compression stroke. The construction used to put this method into effect provides that upward movement of the piston partially closes off the passage for the air into the combustion chamber. A gradually restricted passage into the combustion chamber gives added velocity to the air which is forced through the passage. The result is what is called an intensified directed turbulence. This intensified turbulence imparts a very high velocity to the entire contents of the combustion chamber and therefore also to the fuel cloud and gives added centrifugal pressure to the fuel in this chamber so as to cause it to spread out around the walls of the combustion chamber. Diffusion of the fuel throughout the entire combustion chamber at part load operating condition of the engine is avoided for the same reasons as in the first variation described, that is, since there is very little or no relative motion between the fuel cloud and the air while both are rotating in the combustion chamber.

The characteristics of the fuel injection apparatus used in connection with the two variations of the method of charge formation will be illustrated and described later. These apparatus are of known construction.

Both variations of the method of charge formation provide that at any load condition of the engine all the fuel is being injected into the combustion chamber and is being retained therein. Since ignition takes place at approximately 5 degrees to 30 degrees before the top dead center of the compression stroke there is still an appreciable amount of pure air moving upward at the head of the piston. This air represents 2% to 8% of the piston displacement in volume and 10% to 30% in weight. In order to obtain a high power output per cubic inch of air drawn into the cylinder the maximum amount of fuel injected into the combustion chamber is such as to utilize all the air contained in the combustion chamber plus the amount of air in the cylinder to effect complete combustion. It is therefore evident that at the time of ignition when the engine is operating under full load condition the fuel air mixture contained in the combustion chamber is too rich to permit complete combustion. Therefore combustion will begin slowly and complete combustion will take place when and as additional pure air is supplied to the combustion chamber by the piston as it moves up to dead center position. I call this procedure controlled extended combustion. The result is that instantaneous explosion with the resulting detonation is avoided and that the construction employed to put the described method of charge formation into effect permits an unusually high compression ratio without encountering detonation at maximum engine load and speed. I have used a compression ratio as high as 6.75 to 1 when operating an engine according to the method of charge formation described and when using as a fuel what is commercially termed furnace oil.

In the foregoing description it has been stated that the walls of the combustion chamber have to be kept at a fairly high temperature to assist the vaporization of the fuel droplets.

I have found, that, when operating an engine in accordance with the method of charge formation, which forms the subject matter of my invention, it was possible to obtain a very sudden increase in load and speed if the weight of air drawn into the engine for each engine cycle was progressively reduced when operating at one fourth full load or less and at slow speed idling. The amount of air for each engine cycle can be reduced by means of a throttle, such as known in carburetor engines. Throttling of the air increases the fuel consumption referred to useful power available in the flywheel, since it imposes an additional load on the engine. Increased fuel consumption results in hotter combustion chamber walls. The reduced weight of air results in less cooling of the combustion chamber walls during the suction stroke of the engine by this air and also results in a higher temperature of the combustion gases. These results will tend to maintain the walls of the combustion chamber at such a high temperature that vaporization of the fuel droplets will be greatly expedited.

Several examples of apparatus for carrying out the above methods will now be described.

Referring to the accompanying drawings, which are made a part hereof and on which similar reference characters indicate similar parts, Figure 1 illustrates diagrammatically one form of apparatus for carrying out the method of charge formation forming the subject matter of the present invention, Figures 2 and 3 illustrate diagrammatically variations of structure for carrying out the invention, Figure 4 is a section on line 4—4 of Figure 3, Figure 5, a view of the inside of the combustion chamber of another form of apparatus and may be regarded as a section on line 5—5 of Figure 6 looking upward in the direction of the arrows, and Figure 6, a section on line 6—6 of Figure 5.

Figures 7, 8, 9, and 10 illustrate various stages during the formation of the combustion charge showing diagrammatically a combustion chamber similar to those shown in Figures 2 and 5, when the engine is operating under full load, Figure 10, moreover, showing the combustion charge at the time of ignition.

Figures 11, 12, 13, and 14 are views corresponding to Figures 7 to 10 inclusive with the engine operating under idling or no load conditions.

Figures 11a, 12a, 13a, and 14a' are sections as indicated on Figures 11, 12, 13, and 14 respectively and show the fuel clouds at the various stages of the engine cycle, Figures 7 to 14 inclusive show the extreme conditions of full load and no load but from these diagrams the diagrams of any load condition may be constructed.

Figures 15, 16, 17, and 18 show diagrammatically the inside of combustion chambers illustrating the effect of air entering the combustion chamber during the latter part of the compression stroke showing the air moving in the direction of the arrows which is the direction in which the fuel charge has entered or is entering the combustion chamber.

Figures 15a, 16a, 17a, and 18a are sections as indicated respectively on Figures 15, 16, 17, and 18.

Figures 19, 20, 21, and 22 illustrate diagrammatically the formation of a fuel charge for no load condition of the engine in which the length of the fuel cloud from tip to tail is long enough to form a complete ring about the walls of the combustion chamber. In this form of fuel charge the period of injection of the fuel charge is of the same duration at no load as at full load condition and at any intermediate load condition. In this case the quantity of fuel injected is regulated by varying the pressure under which the fuel is injected.

Figures 23, 24, 25, and 26 illustrate diagrammatically the charge formation when using apparatus such as that shown diagrammatically in Figure 3.

Figures 27, 28, 29, and 30 represent diagrammatically the timing diagrams by which engines of the type referred to may be operated when using my method of charge formation.

Figures 31 and 32 illustrate diagrammatically the position of the piston at the time of ignition showing the combustion chamber filled with combustible charge while the cylinder space above the piston contains pure air, Figure 32 showing the position the piston will assume at the top of dead center at which time the air has been forced into the combustion chamber.

Figure 33 is an indicator diagram of an unextended and uncontrolled combustion at full load operating conditions.

Figure 10:
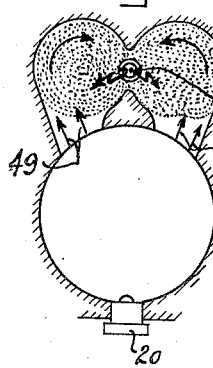

Figure 34, an indicator diagram for full load operating conditions of an engine of the type referred to but employing a controlled extended combustion, Figure 35, a vertical section of a four-cycle engine of the L-head construction type illustrating more fully the subject matter of the invention, Figure 36, a bottom view of the cylinder head of the engine shown in Figure 35, Figure 37, a bottom view of a cylinder head somewhat different from that shown in Figure 36, Figure 38, a sectional view of another design of cylinder head, Figure 39, a section on line 39—39 of Figure 38, showing inlet and outlet valves, Figure 40, a plan view of the bottom of the cylinder head or a section on line 40—40 of Figure 38, Figure 41 is a section on line 41—41 of Figure 38, Figure 42, a vertical section showing a form of cylinder head of the T-head design, Figure 43, a plan view of the underside of the cylinder head shown in Figure 42, Figure 44, a vertical sectional view of an engine, Figure 45, a plan view of the underside of the cylinder head of an engine of the so-called F-type of head design, Figure 46, a sectional view of an engine of the valve-in-head type for carrying out my invention, Figure 47, a plan view of the top of the cylinder block or a section on line 47—47 of Figure 46 looking down, Figure 48, a plan view of the underside of the cylinder head of Figure 46.

Figures 49, 50, and 51 are modified forms of valve in-head type of engine,

Figure 52 is a section through the cylinder of a two-cycle engine for carrying out the present invention, and Figure 53, a section on line 53—53 of Figure 52.

In Figure 1 of the drawings numeral 10 indicates the cylinder block of an internal combustion engine having a piston 11 reciprocable therein. At one side of the cylinder 10 is the combustion chamber 12. A fuel nozzle 13 is positioned at one side of the cylinder 10 so as to project a cone shaped stream of fuel 14 across the cylinder and into the combustion chamber 12. For purposes of description the stream of fuel will be thought of as composed of droplets and will so be described although this stream of fuel will actually be in the form of a finely divided spray. The droplets of fuel will be caused to impinge against the circular wall of the combustion chamber and will be deflected around the walls of the chamber as indicated by the arrows 15, the arrows, of course represent the path of any one droplet of fuel. The whole mass of fuel will be proceeding in somewhat the same course. The fuel will be deflected from the walls of the combustion chamber at substantially the same angle with which it strikes these walls. It should be obvious also that the angle made by a path of fuel droplets will be necessarily less than 90° i. e. the angle 16 in Figure 1 which is the angle between the path of the fuel droplets and a line 17 tangent to the combustion chamber at the point which the droplets engage the walls of the combustion chamber will be less than 90°. In passing from the spray nozzle 13 into the combustion chamber the fuel must pass through a passage 18 between the upper end of the cylinder and the combustion chamber. In traveling from the spray nozzle to the passage 18 the fuel charge encounters hot air which fills the space 19 above the piston 11. During its passage through this chamber the fuel droplets are enveloped by air in the space 19 which is under compression and therefore heated so that some fuel from the outer surface of each droplet will be vaporized to envelop the droplet with a vapor jacket. The droplets with their jackets of fuel vapor around them will strike the hot walls of the combustion chamber and be deflected in the manner shown, the operation being not unlike water droplets bouncing on a hot plate. The fuel charge will be sprayed through the nozzle 13 by any suitable apparatus. Several forms of such apparatus will later be described. On the compression stroke the piston 11 will move from the position shown in Figure 1 further up until it reaches upper dead center at which time the air in the space 19 will be forced into the combustion chamber 12. The details of construction whereby these operations are carried out will be explained further on in the specification.

In the form of construction shown in Fig. 2 the combustion chamber is formed by two small chambers 23 and 24 which have the shape of a body of rotation and which communicate with each other by opening 25. A spray nozzle 20 has two orifices directed to spray the fuel charge in two sprays 21 and 22, one spray for each one of the small chambers 23 and 24. These fuel sprays likewise pass through the space above the engine piston and through passages 26 and 27 into the combustion chambers and strike the walls thereof, whence they are being deflected about these walls.

In Fig. 3 two combustion chambers 28 and 29 are shown which communicate with each other through an opening 30. A single fuel nozzle 31 is positioned to direct a spray of fuel 32 in the form of two jets across the top of the cylinder, this fuel spray engaging the opposite walls of the combustion chambers and separating into two sprays, one of which is deflected about the walls of the combustion chamber 28 and the other about the walls of the combustion chamber 29. The spray of fuel in each of the Figures 1, 2, and 3, as stated, is cone-shaped. The form of the cone, however, is sufficiently small at the point where the fuel passes through the openings into the combustion chamber that it will not engage the walls of the passages 18, 26, 27, etc. i. e. the spray of fuel will make its first contact against the hot inner walls of the combustion chamber into which it is directed.

The construction of the form shown in Figure 3 is shown somewhat more in detail in Figure 4 where numeral 33 indicates the cylinder block and 34 the piston. In this form the piston is shown at its upper dead center position at which time all air in the space at the end of the piston has been forced over into one of the combustion chambers 28 or 29 here shown as chamber 28. Inlet and outlet valves 35 are positioned, one in the combustion chamber 28 and the other in the combustion chamber 29. In this form of construction the piston 34, while traveling through the distance 36 on its upward stroke closes off the passage 18 almost completely, resulting in a directed intensified turbulent motion of the air from the cylinder to the combustion chambers 28 and 29. It will be remembered that directed intensified turbulence is one requirement to practice one of the two variations of the method of charge formation.

In Figures 5 and 6 is shown diagrammatically another form of construction of an L-head type of engine. In this form the fuel nozzle 37 is positioned at one side of the cylinder 38 and directs the spray of fuel through two channels 39 and 40 formed in the cylinder head. These channels communicate with combustion chambers 41 and 42. Inlet and exhaust valves, one of which 43 is only shown, are positioned in the combustion chambers. Line 44a indicates the location of the piston 44 with respect to the combustion chambers 41 and 42. In this form of construction it should be apparent that when the piston 44 is in its uppermost position the cross-sectional area of the channels 39 and 40 through which the air is being transferred into the combustion chambers from the cylinder space 45 has not been reduced and that only the clearance indicated at 46 has been reduced to a practical minimum. Therefore a comparatively smooth flow of air into the combustion chambers occurs while the piston moves to its upper dead center position. Since the construction employed determines the direction in which the air will enter the combustion chambers 41 and 42 I call this flow of air directed turbulence. This form of construction is therefore employed to practice the first variation of the method of charge formation.

Figures 7, 8, 9, and 10 show diagrammatically the action of the fuel charges as they are sprayed across the cylinder into the combustion chambers. The illustrations represent the operation under full load conditions.

Figure 7:
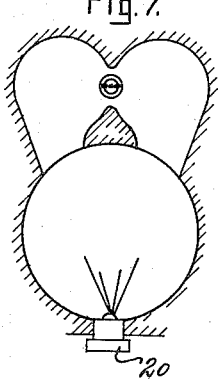

The operation may be regarded as that performed by the form of construction illustrated in Figure 2. In Figure 7 the fuel nozzle 20 has just begun spraying the fuel charge across the top of the cylinder.

Figure 8:
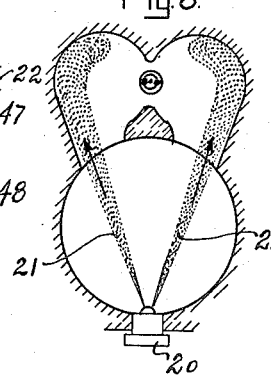

In Figure 8 the fuel charges 21 and 22 have entered the combustion chamber and the charges are of a maximum length. The fuel charges are cone shaped. They leave the orifices of the spray nozzle as a compact liquid stream as shown in Figs. 7 and 8. While traveling across the cylinder at high velocity this compact liquid stream breaks up into fine droplets which are separated from each other by air. An attempt has been made in the drawings to illustrate this condition by showing the fuel droplets as fine dots. The spaces between the dots is thought of as air. The ratio between the weight of the fuel droplets and the weight of air separating these fuel droplets from each other is called the mixture ratio.

Figure 9:
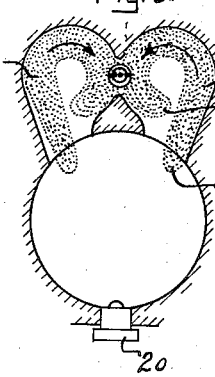

In Figure 9 the fuel jet has ceased to discharge fuel and the fuel cloud has been completely formed.

In Figure 10 the fuel charge has been completely formed and has been circulated about the walls of the combustion chambers by its kinetic energy. This figure indicates the fuel charge as it is being ignited by spark plug 50.

Since under full load operating condition the combustion chamber is being substantially fully filled with the fuel charge as shown in Figure 10 ignition means 50 could be located at any local point of the combustion chamber, but since under no load and part load condition the fuel cloud fills only a portion of the combustion chamber the location of the ignition means 50 is definitely fixed by the location of the fuel cloud at no load to secure ignition at part loads and no load. By comparing Figures 7 to 10 inclusive with Figures 11 to 14 inclusive this necessity may be fully understood. For convenience in describing the fuel charge the part 47 of the fuel clouds 21, 22, and 51 etc. which first enters the combustion chamber will be termed the tip and the trailing end 48, the tail.

The fuel jets described are shown in the drawings as continuous sprays. If the fuel jets are produced by certain types of spray nozzles, commonly known as closed type nozzles, the fuel jets will, particularly at part load injections, actually consist of a plurality of minute fuel discharges, on account of the vibrating action of the spring-loaded needle or check valve of the spraynozzle. If, therefore the fuel charges were carried away by a stream of air intersecting the path of the fuel jets, as they leave the fuel nozzle, it is evident that the fuel air mixture formed, would not be a continuous fuel cloud. The present invention permits the formation of a continuous fuel cloud. It has been explained earlier in the specifications that the fuel jet will slow down while travelling toward the combustion chamber on account of the air resistance. Since the greatest air resistance exists at the tip of the fuel jet, this jet will slow down beginning with the tip. The remainder of the fuel jet, traveling at a greater velocity than the tip, will close up the gaps existing between the separate minute fuel charges, so that a continuous, uninterrupted fuel cloud is secured at the passage leading to the combustion chamber. The process described, is not unlike the action of a train of cars, when the first car is slowed down.

Figure 14:
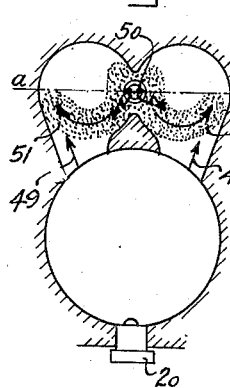
Figure 13:
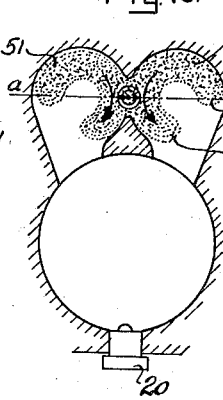
Figure 12:
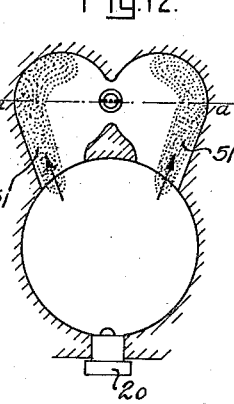
Figure 11:
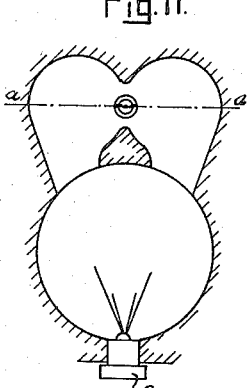
Figure 14A:
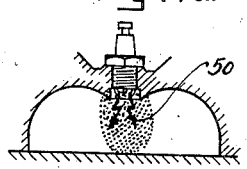
Figure 13A:
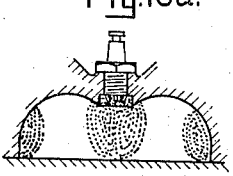
Figure 12A:
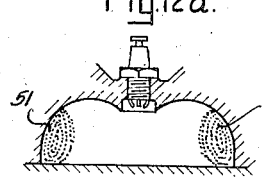
Figure 11A:
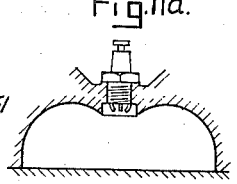

In Figures 11 to 14 inclusive the formation of the charge under idling or no load conditions is illustrated. Figures 11 to 14 inclusive correspond respectively to Figures 7, 8, 9, and 10 in that they correspond to the same times of the engine cycle. Under no load operating conditions commencement of the fuel charge may be identical with the commencement of the fuel injection under full load conditions and termination of the injection under no load condition will then be earlier than under full load condition. In other words under full load conditions injection occurs during a longer period of the engine cycle than under no load conditions but under idling conditions and under any load conditions up to full load conditions injection may begin at substantially the same fixed time of the engine cycle. The result is what may be termed a shorter fuel charge 51 as illustrated in Figures 12, 13, and 14 than the fuel charge under full load operating conditions as shown in Figures 7 to 10 inclusive. Figures 11 to 14 inclusive illustrate the extreme conditions of no load and Figures 7 to 10 illustrate full load conditions. The fuel charge between these conditions will be correspondingly governed.

From the foregoing explanation and from the illustrations in Figures 7 to 14 inclusive it is evident that the fuel air ratio of the fuel cloud is substantially the same at all engine loads, since the size and volume of the fuel cloud is reduced with the engine load.

In Figures 10 and 14 the arrows 49 indicate the direction in which directed turbulent movement of the air into the combustion chamber occurs during the compression stroke. The velocity characteristics of the air movement indicated by arrows 49 has been explained and it also was stated that there exists no or only very little relative movement between the air and the fuel cloud in the combustion chamber. The air velocity is a direct function of the engine speed and the velocity of the fuel cloud can be a direct function of the engine speed when certain known fuel injection apparatus are used, and it is evident that, for instance, the tip 47 of the fuel clouds 22 in Figure 9 and of the fuel cloud 51 in Figure 13 assume the same local position in the combustion chamber, and that this position will remain the same regardless of the engine speed. Attaining of this precisely identical position is not required for the practical operation of the engine since the fuel cloud, formed by my method of charge formation for no load condition of the engine, may cover substantially one half or more of the perimeter of the combustion chamber.

Figures 15 to 18 inclusive illustrate diagrammatically and progressively the effect of air entering the combustion chamber at an increased velocity during the latter part of the compression stroke. This effect, which I have called intensified directed turbulence, may be produced by using the form of construction as shown, and explained in Figure 4. It will be re-called that this construction is used to practice the second variation of the method of charge formation. In Figures 15 to 18 inclusive the air enters in the direction of the arrows 52 which is the same direction as the fuel charge is traveling. The air causes the fuel charge to travel at an increased velocity around the walls of the combustion chamber and to form initially a wall of fuel about these chambers as best shown in Figure 16. Due to the elastic character of the fuel and due to its high velocity the fuel charge increases in length and in width to cover the walls of the chamber. If rotated at a sufficiently high velocity and for a sufficient length of time the fuel charge will have spread substantially over the convex portion of the combustion wall and may therefore be ignited at any local point or points of the said convex portion. The illustrations of Figures 15 to 17 inclusive is no load or idling condition. It should be apparent that at any other load condition the same effect will be produced by intensified directed turbulent motion of the air entering the combustion chamber. As the load is increased, beginning with no load, the thickness of the fuel film will increase. The minimum rate of velocity of the intensified turbulent movement of the air to produce the effect shown in Figures 15 to 18 inclusive is determined by the slowest speed at which an engine of the type referred to is to be operated and by the duration of the effect of the intensified turbulence upon the fuel cloud at that slowest speed. Therefore, spreading of the fuel cloud as shown in Figures 15 to 18 and 15a to 18a will be accomplished at all engine speeds.

In referring back to Figures 9 and 13 it will be noticed that the fuel clouds 22 and 51 are of different volume and of different length, the fuel cloud 51 formed at no load operating condition of the engine being much shorter than the fuel clouds 21 and 22 for full load condition.

In Figures 19 to 22 the charge formation for no load operating condition is progressively illustrated. But while the volume of the fuel clouds 53 is substantially the same as that of the fuel clouds 51 in Figures 12 to 14 inclusive, the length of the fuel cloud 53 is much greater than that of 51. The fuel cloud 53 which is indicated as forming a complete ring about the walls of the combustion chamber is being produced by a fuel injection apparatus which produced at different engine loads a fuel spray of different volume but of the same or very nearly the same length. The effect of the air upon the fuel charge in the combustion chamber is the same as that illustrated and described in Figures 15 to 18 inclusive.

Figures 23 to 26 illustrate progressively the same phases of charge formation for no load operating condition as shown in Figures 11 to 14 but applied to the form of construction such as that illustrated diagrammatically in Fig. 3.

All types of fuel injection apparatus which are of suitable construction to be used on engines of the type referred to are of well known construction and I manifestly declare that the application of the various types of injection apparatus to an engine constructed to put any one of the two variations of the method of charge formation into practice do not represent variations of the method of charge formation as such.

Figures 27 to 30 inclusive illustrate timing diagrams according to which an engine of the type referred to may be operated if the fuel charge is being formed according to either one of the two variations of charge formation.

In these timing diagrams the intake valves or intake ports close at 54. It will be remembered that the fuel charge must remain in the combustion chamber and the air must flow into the combustion chamber during the fuel injection and thereafter. This of course is only the case during the compression stroke. Therefore the earliest time possible for the beginning of injection is at 54 of the compression stroke.

In Figure 27 an injection apparatus of known construction is used in which injection at all loads and no load condition of the engine begins at the same time of the engine cycle, namely at 55, while the duration of injection varies with the engine load so that no load injection terminates at 56 and full load injection at 57. This type of injection apparatus was used to produce fuel clouds in Figures 7 to 14 and Figures 23 to 26 inclusive.

In Figure 28 an injection apparatus of known construction is used in which injection at all loads terminates at substantially the same time of the engine cycle, namely at 58, while the duration of injection varies with the engine load, so that no load injection begins at 59 and full load injection at 60.

In Figure 29 an injection apparatus of known construction is used in which the beginning and termination of injection at various loads occurs at different times of the engine cycle, so that no load injection begins at 61 and terminates at 62 and full load injection commences at 63 and extends to 64.

In Figure 30 an injection apparatus of known construction is employed in which the beginning and the termination of injection at different loads occurs at the same times of the engine cycle, so that full load and no load injection commence at 65 and terminate at 66. This type of injection was used in Figures 19 to 22 inclusive. In this form of injection apparatus the quantity of fuel is being varied by the fuel pressure.

It will be noticed that in all the timing diagrams Figures 27 to 30 inclusive no load injection and part load injection occur over a period of time within the duration of full load injection.

Ignition is shown to occur after full load injection has terminated, at 67 which is between 5 degrees to 30 degrees before the upper dead center 68.

In the timing diagrams directed turbulent movement of the air from the cylinder into the combustion chamber begins at 54, continues to 68 if the engine construction for the first variation of the method of charge formation is employed. The directed turbulent movement of the air is increased to an intensified directed turbulent movement at a fixed moment during the compression stroke shown as 69, if the engine construction for the second variation of the method of charge formation is used. The point 69 represents the moment in the engine cycle, during the compression stroke at which the engine piston begins to close off the passage or passages connecting the engine cylinder with the combustion chamber. This can be understood best by referring to Figure 4. This moment 69 may be as much as 50 degrees before the top dead center 68.

A better understanding of Figures 27, 28, and 29 may be had by reference to Figures 12, 13, and 14 as explained above. The fuel charge enters the combustion chamber and then the period of injection stops so that the fuel charge enters as an elongated charge having a tip 47 and a tail 48 as described, the tip being the portion of the fuel charge which first enters the combustion chamber and the trailing end of the charge the tail. The distance between the tip and the tail is the length of the fuel charge. The portion of the wall of the combustion chamber which at the time of ignition is in contact with the fuel cloud may be called the range of contact. It is evident that the fuel cloud for no load or idling condition of the engine is of a predetermined and definite length and that the location of the range of contact within the combustion chamber is definitely established and is fixed by the beginning and termination of the injection with respect to the engine cycle. It should be evident also that as long as the ignition means are placed at one or more local points in the combustion chamber which points at the time of ignition fall within the range of contact of the fuel cloud formed at no load condition it will be possible to ignite the fuel charge at all loads.

The piston continues to travel on its compression stroke from 67 to dead center 68. During this latter travel the pure air at the end of the piston is forced into the combustion chamber to further promote combustion therein at full load and nearly full load condition of the engine. This in effect produces a continuation of pressure in the combustion chamber and results in practically a non-detonating action in the engine.

Figures 31, 32, and 34 illustrate what has been termed controlled extended combustion at full load operating conditions and is applicable to both of the methods of forming a fuel charge illustrated above. In Figure 31, at the time of ignition the piston 74 is at the position indicated and must travel the distance 70 before reaching the top dead center position 68. The combustion chamber 75 is substantially completely filled with the combustible fuel charge. The cylinder space 77 above the piston contains pure air. After the ignition of the fuel charge the piston travels to the position shown in Figure 32. While traveling from the position shown in Figure 31 to that shown in Figure 32 the free air is forced through the channel 76 into the combustion chamber. This air serves to complete the combustion in this chamber during the latter period of the stroke and will extend the duration of combustion even beyond the upper dead center.

In Figure 33 is shown a typical indicator diagram of an engine in which there is no extended controlled combustion at full load operating conditions. Combustion takes place substantially at what is generally termed constant volume. Therefore the maximum pressure is relatively high.

Figure 34 represents an indicator diagram for full load operating conditions of an engine of the type referred to but employing a controlled extended combustion. Though the compression pressures of Figures 33 and 34 are of the same magnitude, the maximum pressure in Figure 34 is lower than in Figure 33 and combustion takes place partly at constant volume and partly at constant pressure.

Figures 35 and 36 illustrate in cross section a four cycle engine of the L-head construction which operates in accordance with my invention. This includes cylinder block 80 of conventional construction having a piston 81 movable therein and connected by a connecting rod 82 to a crank shaft 83 of conventional construction. A combustion chamber 84 is formed at the end of the cylinder in a head 85. Inlet and exhaust valves 86 and 87 are positioned within the combustion chamber, the combustion chamber being of sufficient depth to permit unobstructed opening of said valves. A circular pocket 88 is formed in the bottom of the cylinder head 85 and is in line with the cylinder bore 89 and serves to receive the piston head 81 when the piston is in the upper dead center position. This construction provides intensified turbulence during the latter part of the compression stroke. A spray nozzle 90 is mounted in the side of the cylinder head 85 and is positioned so as to direct the fuel spray substantially at a right angle to the vertical axis of the cylinder 89. The fuel jets are arranged so as to travel in paths 91 and 92 across the space 98 into the combustion chambers formed above the inlet and exhaust valves. The arrangement is such that the fuel jets travel across the cylinder bore and through the air under compression therein, the fuel jets being permitted to travel in an unobstructed manner. Fuel is supplied to the spray nozzles 90 by a fuel pump 93. This pump may be of any suitable known construction. Fuel is supplied to the injectors through the pipe 94. The fuel pump 93 is operated from the crank shaft 83 by means of sprockets 95, 96 and 97 and a chain 98 of any suitable construction. Spark plugs 99 of known construction are mounted in the cylinder head 85. These spark plugs may be set back from the inner wall of the cylinder head in pockets 100. In practical operation this pocket may be approximately ⅛ inch in depth. The fuel cloud moves at all loads and at all speeds of the engine across the pocket 100. Electric energy for creating the spark is supplied by a cable 101. The source of the electric energy and the means for distributing the energy to the spark plugs in a properly timed manner are of well known construction and need not be explained here. The cylinder head 85 is provided with a water jacket 102 which jacket communicates through a bore 103 with the space 104 surrounding the cylinder. A space 105 is formed between the wall 106 of the combustion chamber and the inner wall 107 of the water jacket 102. This space does not contain cooling water so that the wall 106 may be heated much hotter than it would be otherwise. The fuel charge which sweeps across the top of the cylinder and through the combustion chamber will strike the hot walls 106 of the combustion chamber. Actual tests of an engine constructed in accordance with the method herein explained show that when operating under full load conditions the wall of the combustion chamber though not cooled by water is nevertheless not heated to too high a temperature but remains dark. The inlet valve 86 is positioned in an inlet port 108 which is connected to an inlet manifold 109 and is controlled by a butterfly valve 110. The butterfly valve is mounted upon a shaft 111 to which is attached a lever 112. A lever 113 on the fuel pump is connected by means of a link 114 with the lever 112. At the end adjacent the butterfly valve the lever 114 is slotted at 115 in which slot engages a pin 116 on the lever 112. As will be apparent a lost motion is permitted between the lever 113 and the lever 112. With the butterfly valve in a given position the linear distance which the link 114 may travel without moving lever 112 is equal to the length of the slot 115 which is represented by C. The butterfly valve 110 is held biased to wide open position against a stop not shown. In the fuel pump a represents the position of the control lever 113 when the pump is operating at full load injection, b represents the position of the lever at one-fourth (¼) load injection and point d the position of the lever at slow speed or idling condition of the engine. From the explanation given it should be apparent that the butterfly valve will remain wide open between approximately one-fourth (¼) load and full load operating conditions of the engine since the link 114 when being moved while the lever 113 swings from point a to point b will slide on the pin 116 of the lever 112 until the end of the slot 115 contacts the pin 116. While the lever 113 is being moved from point b to point d the link 114 will swing the amount indicated by angle e and will cause the butterfly valve to oscillate about its axis by an amount indicated by the angle f and in so doing the butterfly valve will reduce the effective cross sectional area through which the air has to pass before entering the engine cylinder and thereby reduce the amount of air drawn into the cylinder.

During the idling of the engine and at slow speed the smallest amount of air in the cylinder is desired. The position of the butterfly valve corresponding to the smallest amount of air at the desired slow speed is being determined by the speed and by the no load position of the control lever 113 of the fuel pump. The control lever 113 of course is operated by the operator of the engine as desired. The reason for regulating the amount of air at slow speed, at no load and at light load operating condition have been explained in the description for the method of forming the fuel charge.

In the form of engine shown in Figures 38 to 41 the cylinder block 117 is of known construction having a cylinder head 118. The inside of the cylinder head is provided with a metal shield 119 against which the fuel spray 120 is projected from the fuel nozzle 121. Combustion chambers 122 and 123 are formed about inlet and exhaust valves 124 and 125. Channels 126, 127 are formed in the underside of the cylinder head 118. These channels run from the spray nozzle 121 across the cylinder into the channels connecting the circular sections of the combustion chamber with the cylinder. These channels provide unobstructed passages for the fuel from the spray nozzles to the combustion chambers. A single spark plug 128 is positioned in the space joining two circular portions of the combustion chamber. It will be apparent that the air which is delivered into the combustion chamber going in the direction of the arrows shown in Figure 40 will be traveling in the direction of the fuel jets which are delivered into the combustion chamber.

Figures 42 and 43 illustrate another form of an engine of the T-head design having a cylinder block 128, a piston 129 movable therein and a cylinder head 130. The combustion space consists of two circular chambers 131, 132 located directly above and around inlet valve 133 and exhaust valve 134. A single spray nozzle 135 is positioned in the center of the cylinder head and controlled to direct jets of fuel in opposite directions into the combustion chambers as best shown in Figure 43. Spark plugs 136 are positioned in each of the combustion chambers. In Figure 42 the piston is shown in its upper dead center position. Fuel injection occurs and ignition occurs while there is still a substantial clearance between the end of the piston 129 and the inner wall of the cylinder head 130. The fuel jets are permitted to travel across the space at the head of the piston and to enter the circular portions of the combustion chambers in an unobstructed path.

Figures 44 and 45 illustrate diagrammatically a cross section through the cylinder block 137 and the cylinder head 138 of an engine of the so-called F-head design. The cylinder block preferably carries exhaust valve 139. The cylinder head preferably carries an inlet valve 140. The bottom of the cylinder head, as is best shown in Figure 45, has a pocket 141 which is a continuation of the cylinder bore and serves to receive the head of the piston 142 which, when in the upper dead center position, substantially fills this pocket. The bottom of the cylinder head contains a combustion chamber 143 the shape of which is best shown in Figure 45. This combustion chamber contains a circular portion which is located directly above and around the exhaust valve 139. A spray nozzle 144 is mounted in the cylinder head and is directed so as to send a stream of fuel across the space at the head of the piston and into the combustion chamber. A spark plug 145 is mounted in the upper wall of the combustion chamber. No shielding is provided in the combustion chamber since its walls are swept by the hot exhaust gases only whereby they will remain at a sufficiently high temperature.

Figures 46, 47, and 48 illustrate a form of valve-in-head engine having a cylinder block 146 and a piston 147 movable therein. The combustion chamber 148 is substantially the same as that shown in Figure 1. This combustion chamber is formed partly in the cylinder block and partly in the cylinder head 149. Spray nozzle 150 is mounted in the upper end of the cylinder block and directs a jet of fuel across the space at the head of the piston and into the combustion chamber. A shield 151 may be positioned in the combustion chamber against which the jet of fuel impinges. The piston 147 is shown in Figure 46 in a position it assumes during the injection period, and is approaching the bottom of the cylinder head 149 and moves upwardly until the clearance at the head of the piston has reached the smallest practical minimum which may be approximately one sixteenth ($\frac{1}{16}$) of an inch. Inlet valve 152 and outlet valve 153 are mounted in the cylinder head 149. A spark plug 154 is also mounted in the cylinder head in the wall of the combustion chamber.

Figures 49, 50, and 51 show still another variation of a valve-in-head type of engine having a cylinder block 155, a piston 156 and a cylinder head 157. This form differs from that shown in Figures 46, 47, and 48 only in that the combustion chamber 158 is turned 90° so that the plan of the cylinder block as shown in Figure 50 coincides with the sectional view indicated in Figure 46. Also while in Figure 46 the spark plug is located directly in the wall of the combustion chamber, in Figure 49 the location of the spark plug 159 is indicated as in close proximity to the perimeter of the combustion chamber. The distance from the perimeter of the combustion chamber is determined by the depth of the fuel cloud which fuel cloud is shown in Figures 15 and 16.

Figures 52 and 53 illustrate diagrammatically the cylinder 160 and piston 161 of a two-cycle engine. This form has a combustion chamber 162 formed in the cylinder head 163 which chamber is substantially spherical in shape. In Figure 52 the piston is shown in the position at the end of the fuel injection. At the upper dead center position the smallest possible clearance will be obtained between the end of the piston and the inner wall 164 of the cylinder head. The intensified turbulent movement of the air from the end of the piston 160 into the combustion chamber is obtained, and at the time of ignition a fuel vapor film will cover the wall of the ball-shaped combustion chamber, this fuel film being distributed over the wall substantially in the same manner illustrated in Figures 15 and 16. A spark plug 165 is mounted in the cylinder head and in the wall of the combustion chamber. A metal shield 166 covers the entire wall of the combustion chamber. One purpose of this shield is to preserve a sufficient amount of heat for vaporization of the fuel charge. The location of the spark plug is relatively unimportant since the entire wall of the combustion chamber is lined with fuel. The spark therefore may be located at the most convenient point. A fuel spray nozzle 167 is positioned in the cylinder head and directed so as to send a stream of fuel across the space at the head of the piston and into the combustion chamber.

The drawings disclose ignition means in the form of electric sparkplugs. These plugs may be of the usual type used in gasoline engines. The sparkplugs receive electric energy from a source such as an electric battery in connecting with a usual high tension coil, a condenser and a distributor. The high tension coil can be of the vibrating type, so that a plurality of sparks occur during a predetermined time interval of the engine cycle. A high frequency alternating electric generator producing preferably during a fixed time interval of the engine cycle an ignition arc across the electrodes of the sparkplug may also be used as a source of electric energy. If such an ignition apparatus is employed, for instance, on the engine shown in Figures 5, 6, 38, 40, and 41 an ignition arc may be produced on the sparkplug preferably during the last 45 degrees of the compression stroke and the fuel injection will then be timed to begin at a predetermined moment of the compression stroke, so that the tip of the fuel cloud will contact the ignition arc at approximately 25 to 5 degrees before the end of the compression stroke, depending on the engine speed and load. From the above named drawing, it is obvious that the fuel injection period may extend into the downstroke, following the compression stroke. At part load operating condition of the engine a localized combustible fuel-air mixture is formed while the fuel travels from the injection valve towards the sparkplug in substantially the same manner as explained earlier in the specification. Referring to Figures 7 to 10, it can be assumed that an ignition arc or a plurality of successive sparks occur on the sparkplug 50 during the time interval of the engine cycle during which the various steps of the charge formation illustrated occur. Figure 7 may illustrate the engine condition at approximately 45 degrees before top dead center and Figure 10 the engine condition at top dead center of the compression stroke. When the tip 47 of the fuel cloud contacts the ignition arc, occurring on the sparkplug, it will be ignited. This position of the fuel cloud is approximately illustrated in Figure 9. The burning tip 47 will continue its travel and unburnt portions of the fuel cloud will pass through the ignition arc. It is obvious that the fuel clouds formed for part load conditions of the engine, as shown in Figures 11 to 14 and 19 to 26 may be ignited in substantially the same manner as explained above.

From the foregoing it is obvious that many types of ignition apparatus may be employed to ignite the fuel clouds formed according to the method of charge formation described, without departing from the spirit of the present invention. It is also clear that the time of injection is not limited to that shown in the timing diagrams of Figures 27 to 30. These timing diagrams illustrate the close interrelation between the time of injection and the time of ignition if the engine is operated so that the moment at which a single spark or the first one of a plurality of sparks occur on the sparkplug is substantially identical with the moment of beginning of combustion of the fuel cloud. In other words, the timing of the spark determines the beginning of combustion. If, however, a plurality of successive sparks occur, for instance during the last 45 degrees of the compression stroke, as explained above, it is obvious that the beginning of combustion can be determined by the beginning of the fuel injection, and it can be varied by varying the beginning of the fuel injection within the range of duration of the successive sparks or the ignition arc.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. In an internal combustion engine, means for forming a fuel charge comprising a fuel spray nozzle, a combustion chamber, a cylinder bore between said fuel nozzle and said combustion chamber and passage means between said chamber and said cylinder bore whereby the fuel sprayed from said nozzle will be sprayed across the upper part of said cylinder and will pass unrestricted through said passage into said combustion chamber, and timed ignition means for igniting the fuel charge in said combustion chamber, substantially as set forth.

2. An internal combustion engine comprising an engine cylinder, means adjacent said cylinder providing a combustion chamber means providing a passage between said cylinder and said chamber, said passage having sufficient cross-sectional area to permit unobstructed entry of a fuel spray into said combustion chamber, means providing an opening for the admission of an air-charge to said cylinder and to said combustion chamber, means providing timed artificial ignition in said combustion chamber, means for injecting atomized liquid fuel at part load across or partly across said cylinder into said combustion chamber to form at least about part of the wall of said combustion chamber a combustible fuel-air mixture and said fuel injection means being constructed so as to impart sufficient velocity to said fuel to move said fuel-air mixture to the vicinity of said ignition means and said injection means being timed to place said fuel-air mixture into the vicinity of said ignition means at the time of ignition.

3. An internal combustion engine comprising an engine cylinder, means adjacent said cylinder providing a combustion chamber, means providing a passage between said cylinder and said chamber, means providing an opening for the admission of an air charge to said cylinder and to said combustion chamber, means to cause compression of said air charge and to effect displacing thereof from said engine cylinder into said combustion chamber, means for injecting a spray of atomized liquid fuel at part load across or partly across said cylinder into said chamber to contact the walls of said chamber while maintaining the continuity of said spray, said fuel injection means being constructed so as to impart sufficient velocity to said fuel to move it to the vicinity of said ignition means and said injection means being timed to place said fuel into the vicinity of said ignition means at the time of ignition, means associated with said wall to effect vaporization of said atomized fuel while it travels towards said ignition means, and said cylinder arranged with respect to said passage and said chamber to cause the flow of air effected by said compression means to follow the general direction of said fuel spray and to produce an air velocity approximately equal to the velocity of said fuel spray to prevent material diffusion of said fuel into said air within the said combustion chamber.

4. In an internal combustion engine a cylinder and a piston arranged therein, means forming a combustion chamber in the shape of a body of revolution, means forming a passage between said chamber and said cylinder, said passage being arranged with respect to said chamber to introduce air into and cause rotation thereof in said chamber about the axis of said chamber during the compression stroke, means for injecting atomized fuel across or partly across said cylinder through said passage into said chamber to form while traveling through the air in said cylinder, and when entraining with a portion of the air flowing through said passage, a fuel cloud of predetermined dimensions, timed ignition means located in said chamber, said ignition means being timed to ignite said fuel cloud upon movement thereof to the vicinity of the ignition means due to the kinetic energy imparted to said fuel by said injection means.

5. In an internal combustion engine a cylinder and a piston arranged therein, means forming a combustion chamber in the shape of a body of revolution, means forming a passage between said chamber and said cylinder, said passage being arranged with respect to said chamber to introduce air into and cause rotation thereof in said chamber about the axis of said chamber during the compression stroke, means for injecting atomized fuel across or partly across said cylinder through said passage into said chamber to form while traveling through the air in said cylinder, and when entraining with a portion of the air flowing through said passage, a fuel cloud of predetermined dimensions, timed ignition means located in said chamber, said ignition means being timed to ignite said fuel cloud upon movement thereof to the vicinity of the ignition means due partly to the kinetic energy imparted to said fuel by said injection means and partly due to said air moving in the direction of said fuel cloud.

6. In an internal combustion engine a cylinder and a piston arranged therein, means forming a combustion chamber in the shape of a body of revolution, means forming a passage between said chamber and said cylinder, said passage being arranged with respect to said chamber to introduce air into and cause rotation thereof in said chamber about the axis of said chamber during the compression stroke, means for injecting atomized fuel across or partly across said cylinder through said passage into said chamber to form while traveling through the air in said cylinder, and when entraining with a portion of the air flowing through said passage, a fuel cloud of predetermined dimensions, timed ignition means located in said chamber, said ignition means being timed to ignite said fuel cloud after spreading of said cloud about the walls of the combustion chamber has been effected due to the velocity of said rotating air and due to the kinetic energy imparted to said fuel by said injection means.

7. In an internal combustion engine of L-head construction employing fuel injection and timed ignition a combustion chamber formed about the inlet and exhaust valves substantially as two adjacent bodies of rotation contacting each other to form a pronounced apex at the point of contact and a passage between the engine cylinder and the combustion chamber, the center of said passage being a common tangent to both bodies of rotation and said passage being proportioned so as to direct the air or combustible charge passing therethrough into said chamber towards said apex, so that said charge will be divided to rotate substantially as two separate portions.

8. A two cycle internal combustion engine comprising a cylinder and a piston arranged therein, a combustion chamber of substantially spherical shape arranged adjacent said cylinder and laterally at the upper end thereof, a passage between said chamber and said cylinder, entering said chamber tangentially, a fuel nozzle arranged on said cylinder and substantially opposite said chamber and in line with said passage, said piston adapted to progressively reduce the cross sectional area of said passage during the latter part of the compression stroke and timed ignition means in said chamber.

9. In an internal combustion engine with timed ignition having an engine cylinder, a combustion chamber and a passage between said engine cylinder and said chamber, the method of forming and burning a combustible fuel air mixture which comprises, compressing an atmosphere of air in said cylinder and chamber, injecting atomized fuel across or partly across said cylinder towards said passage during a predetermined interval of the compression stroke simultaneously causing an air movement from said cylinder, through said passage into said chamber, regulating the duration of the injection interval in proportion to engine load so that the fuel will mix with a predetermined and variable portion of said air flowing through said passage to form a combustible fuel cloud prior to their entry into said combustion chamber, and igniting the fuel cloud upon its entry into said combustion chamber, at least at part load operation of the engine.

10. The method of charge formation and combustion as claimed in claim 9 further characterized in that the linear distance from the spray nozzle to the ignition means, the velocity of the fuel jet across the cylinder and the time of injection are interrelated so that at least the tip of the fuel cloud is within the combustion chamber at the time of ignition.

11. An internal combustion engine comprising a cylinder-block, a cylinder in said block and a piston in said cylinder, a cylinder head; inlet and exhaust valves in said cylinder head, said valves opening into said cylinder, a combustion chamber in the shape of a body of revolution formed jointly by said cylinder block and said cylinder head, said chamber arranged adjacent the upper end of said cylinder and laterally of said cylinder and in communication with said cylinder, a spray nozzle arranged on the upper end of said cylinder substantially opposite said chamber whereby fuel sprayed from said nozzle will travel across said cylinder and will enter said chamber tangentially, ignition means in said chamber and said piston adapted to progressively separate said combustion chamber from said cylinder.

12. An internal combustion engine as claimed in claim 11 further characterized in that substantially one half of said combustion chamber is formed as a cavity in said cylinder block and the other half in said cylinder head.

13. An internal combustion engine as claimed in claim 11 further characterized in that the combustion chamber is formed as a cavity in said cylinder block.

14. In an internal combustion engine having a cylinder, a piston a combustion chamber with curved peripheral wall, a passage arranged tangentially with respect to said chamber, timed ignition means in said chamber and timed injection means on said cylinder, positioned to direct a spray of fuel across at least part of said cylinder through said passage to be deflected about said peripheral wall, and said ignition means positioned in the path of said fuel spray, the method of forming and burning a combustible fuel charge which comprises providing an air charge in said cylinder and chamber, transferring said charge contained in said cylinder into said chamber, injecting during the compression stroke atomized fuel at high velocity across said cylinder into said chamber to impregnate a portion of said air charge with fuel and to move said impregnated portion past said ignition point, rotating said air charge in said chamber in the direction of travel of said impregnated portion to prevent material diffusion of the latter and igniting said portion at said ignition point.

15. In an internal combustion engine having a cylinder, a piston a combustion chamber with curved peripheral wall, a passage arranged tangentially with respect to said chamber, timed ignition means in said chamber and timed injection means on said cylinder positioned to direct a spray of fuel across at least part of said cylinder through said passage to be deflected about said peripheral wall, and said ignition means positioned in the path of said fuel spray, the method of forming and burning a combustible fuel charge which comprises providing an air charge in said cylinder and chamber, transferring said charge contained in said cylinder into said chamber, impregnating a variable portion of said air charge in proportion to engine load to form a combustible fuel cloud and moving said fuel cloud to the vicinity of said ignition point by injecting during the compression stroke atomized fuel at high velocity across at least part of said cylinder into said chamber, rotating the unimpregnated portion of air in said chamber in the direction of travel of said fuel cloud to prevent material diffusion of the latter and igniting said fuel cloud when a predetermined portion thereof is in the vicinity of said ignition point.

16. In an internal combustion engine having a cylinder, a piston, a combustion chamber with curved peripheral wall, a passage arranged tangentially with respect to said chamber, timed ignition means in said chamber and timed injection means on said cylinder positioned to direct a spray of fuel across at least part of said cylinder through said passage to be deflected about said peripheral wall, and said ignition means positioned in the path of said fuel spray, the method of forming and burning a combustible fuel charge which comprises providing an air charge in said cylinder and chamber, transferring said charge contained in said cylinder into said chamber, impregnating a variable portion of said air charge in proportion to engine load to form a combustible fuel cloud and moving said fuel cloud to the vicinity of said ignition point by injecting during the compression stroke atomized fuel at high velocity across at least part of said cylinder into said chamber, rotating the unimpregnated portion of air in said chamber in the direction of travel of said fuel cloud to prevent material diffusion of the latter, beginning the period of fuel injection after said air charge has been admitted to said cylinder and terminating it before ignition takes place and igniting said fuel cloud when a predetermined portion thereof is in the vicinity of said ignition means.

17. In an internal combustion engine having a cylinder, a piston, a combustion chamber with curved peripheral wall, a passage arranged tangentially with respect to said chamber, timed ignition means in said chamber and timed injection means on said cylinder positioned to direct a spray of fuel across at least part of said cylinder through said passage to be deflected about said peripheral wall, and said ignition means positioned in the path of said fuel spray, the method of forming and burning a combustible fuel charge which comprises providing an air charge in said cylinder and chamber, transferring said charge contained in said cylinder into said chamber, impregnating a variable portion of said air charge in proportion to engine load to form a combustible fuel cloud and moving said fuel cloud to the vicinity of said ignition point by injecting during the compression stroke atomized fuel at high velocity across at least part of said cylinder into said chamber, rotating the unimpregnated portion of air in said chamber in the direction of travel of said fuel cloud to prevent material diffusion of the latter, relating the velocity of injection of the fuel charge, the time of injection and the time of ignition so that ignition occurs when the range of contact of the fuel cloud formed under all load conditions overlaps said ignition point.

18. In an internal combustion engine having a cylinder, a piston, a combustion chamber with curved peripheral wall, a passage arranged tangentially with respect to said chamber, and interconnecting the latter with said cylinder, timed ignition means in said chamber and timed injection means on said cylinder positioned to direct a spray of fuel across at least part of said cylinder through said passage to be deflected about said peripheral wall, and said ignition means positioned in the path of said fuel spray, the method of forming and burning a combustible fuel charge which comprises providing an air charge in said cylinder and chamber, transferring said charge contained in said cylinder into said chamber, impregnating a variable portion of said air charge in proportion to engine load to form a combustible fuel cloud and moving said fuel cloud to the vicinity of said ignition point by injecting during the compression stroke atomized fuel at high velocity across at least part of said cylinder into said chamber, rotating the unimpregnated portion of air in said chamber in the direction of travel of said fuel cloud to prevent material diffusion of the latter, regulating the quantity of air provided in said cylinder and chamber to progressively increase the fuel air ratio of said fuel cloud and the ratio of fuel to the entire air charge at engine loads below a predetermined value of engine load, and igniting said fuel cloud when a predetermined portion thereof is in the vicinity of said ignition point.

19. The method of operating an internal combustion engine having a cylinder, a piston, a combustion chamber of substantially curved peripheral wall, a passage arranged tangentially with respect to said chamber and interconnecting the latter with said cylinder, timed ignition means in said chamber and timed injection means on said cylinder positioned to direct a spray of fuel across at least part of said cylinder through said passage to be deflected about said peripheral wall, and said ignition means in the path of said fuel spray which comprises providing an air charge in said cylinder and chamber, transferring said charge contained in said cylinder into said chamber, impregnating a variable portion of said air charge in proportion to engine load to form a combustible fuel cloud and moving said fuel cloud to the vicinity of said ignition point by injecting during the compression stroke atomized fuel at a velocity substantially in proportion to engine speed across at least part of said cylinder into said chamber, rotating the unimpregnated portion of air in said chamber at a velocity in proportion to engine speed in the direction of travel of said fuel cloud to prevent material diffusion of the latter, regulating the quantity of air provided in said cylinder and chamber to progressively increase the fuel-air ratio of said fuel cloud and the ratio of fuel to said entire air charge at engine loads and speeds below a predetermined value of engine load and speed, and igniting a predetermined portion of said fuel cloud when it is in the vicinity of said ignition point.

20. In an internal combustion engine having a cylinder, a piston, a combustion chamber formed by two adjacent bodies of revolution, two separate passages arranged tangentially with respect to said chamber and connecting the latter with said cylinder, timed ignition means in said chamber and timed injection means on said cylinder positioned to direct two sprays of fuel across at least part of said cylinder through said passages to be deflected about the wall of said chamber and said ignition means positioned in the path of at least one of said fuel sprays, the method of forming and burning a combustible fuel charge, which comprises providing an air charge in said cylinder and chamber, transferring said charge contained in said cylinder through said passages into said chamber, concurrently impregnating two variable portions of said air charge in proportion to engine loads to form two individual combustible fuel clouds and moving said fuel clouds about the wall of said chamber by concurrently injecting during the compression stroke two variable jets of atomized fuel at high velocity across at least part of said cylinder into said chamber and at least one jet past said ignition point, and burning both fuel clouds by igniting a predetermined portion of at least one fuel cloud when it is in the vicinity of said ignition point.

21. In an internal combustion engine having a cylinder, a piston a combustion chamber formed by two adjacent bodies of revolution, two separate passages arranged tangentially with respect to said chamber and connecting the latter with said cylinder, timed ignition means in said chamber and timed injection means on said cylinder positioned to direct two sprays of fuel across at least part of said cylinder through said passages to be deflected about the wall of said chamber and said ignition means positioned in the path of at least one of said fuel sprays, the method of forming and burning a combustible fuel charge, which comprises providing an air charge in said cylinder and chamber transferring said charge contained in said cylinder through said passages into said chamber concurrently impregnating two variable portions of said air charge in proportion to engine loads to form two individual combustible fuel clouds and moving said fuel clouds about the wall of said chamber by concurrently injecting during the compression stroke two variable jets of atomized fuel at high velocity across at least part of said cylinder into said chamber and igniting both fuel clouds when the tip portion of one cloud and tail portion of the other cloud are at said ignition means.

22. In an internal combustion engine having a cylinder, a piston, a combustion chamber formed by two adjacent bodies of revolution, a common passage arranged tangentially with respect to both bodies of revolution and interconnecting said chamber and cylinder, timed ignition means in said chamber and timed injection means on said cylinder positioned to direct a spray of fuel across at least part of said cylinder through said passage to be deflected about the walls of said chamber and said ignition means positioned in the path of said fuel spray, the method of forming and burning a combustible fuel charge which comprises providing an aircharge in said cylinder and chamber, transferring said charge contained in said cylinder into said chamber to rotate therein as two individual portions, concurrently impregnating two variable portions of said aircharge in proportion to engine loads to form two individual combustible fuel clouds and moving said fuel clouds to the vicinity of said ignition means by injecting during the compression stroke a spray of atomized fuel at high velocity across at least part of said cylinder into said chamber along a chord forming a common tangent to said adjacent bodies of revolution and burning said fuel clouds by igniting at least one of the clouds when a predetermined portion thereof is in the vicinity of said ignition means.

23. In an internal combustion engine having a cylinder, a piston a combustion chamber with a substantially curved peripheral wall, a passage arranged tangentially with respect to said chamber and interconnecting said cylinder and chamber, said piston adapted to close off said passage during the last part of the upstroke, timed ignition means in said chamber and timed injection means on said cylinder positioned to direct a spray of fuel across or partly across said cylinder through said passage to be deflected about said peripheral wall and said ignition means positioned in the path of said fuel spray within the combustion chamber, the method of forming and burning a combustible fuel charge which comprises providing an air charge in said cylinder and chamber, forcing said charge contained in said cylinder into said chamber, and rotating it therein, impregnating a portion of said aircharge with fuel to form a combustible fuel cloud and rotating said cloud within said chamber by injecting during the compression stroke atomized fuel at high velocity across at least part of said cylinder into said chamber, rotating said fuel cloud at high velocity during the last part of the compression stroke by sustaining a high rate of rotation of the air charge within said chamber to spread said fuel cloud into a substantially uninterrupted ring and then igniting said fuel cloud at said ignition means.

24. In an internal combustion engine having a cylinder, a piston, a combustion chamber with a substantially curved peripheral wall, a passage arranged tangentially with respect to said chamber and interconnecting said cylinder and chamber, said piston adapted to close off said passage during the last part of the upstroke, timed ignition means in said chamber and timed injection means on said cylinder positioned to direct a spray of fuel across or partly across said cylinder through said passage to be deflected about said peripheral wall and said ignition means positioned in the path of said fuel spray within the combustion chamber, the method of forming and burning a combustible fuel charge which comprises providing an air charge in said cylinder and chamber, forcing said charge contained in said cylinder into said chamber, and rotating it therein, impregnating variable portions of said air charge dependent on engine loads to form a combustible fuel cloud and rotating said cloud within said chamber by injecting during the compression stroke variable quantities of atomized fuel in proportion to load demands at high velocity across at least part of said cylinder into said chamber, rotating said fuel cloud at high velocity during the last part of the compression stroke by sustaining a high rate of rotation of the air charge within said chamber, said fuel cloud into a substantially uninterrupted ring having a radial depth which varies in proportion to engine loads, and then igniting said fuel cloud at said ignition means.

25. An internal combustion engine comprising means providing a combustion chamber with curved peripheral wall, means providing an engine cylinder, passage means providing an opening for the admission of compressed air and fuel to said chamber, said passage means being arranged tangentially with respect to said combustion chamber, means providing timed electrical ignition in said chamber, means for injecting at high velocity finely divided fuel at part load, during the compression stroke of the engine across or partly across said cylinder and into said chamber to form with a part of the combustion air a localized fuel-air mixture and to move said localized mixture to the vicinity of said ignition means at the time of ignition.

26. An internal combustion engine comprising means providing a combustion chamber with curved peripheral wall, means providing an engine cylinder, passage means providing an opening for the admission of compressed combustion air and fuel to said chamber, said passage means being arranged tangentially with respect to said combustion chamber, means providing timed electrical ignition in said chamber, a fuel injecting device located on said cylinder and directed towards said opening, said device being provided for injecting atomized fuel at part load into a part of said combustion air and directly toward said ignition means to form a localized combustible fuel-air mixture and said device being constructed to impart to said fuel sufficient kinetic energy to move said fuel to said ignition point at the time of ignition.

27. An internal combustion engine comprising means providing a combustion chamber with curved peripheral wall, means providing an engine cylinder, passage means providing an opening for the admission of compressed combustion air and fuel to said chamber, said passage means being arranged tangentially with respect to said combustion chamber, means providing timed electrical ignition in said chamber, a fuel injecting device located on said cylinder and directed towards said opening, said device being provided for injecting atomized fuel at part load into a part of said combustion air and indirectly towards said ignition means to form a localized combustible fuel-air mixture and said device being constructed to impart sufficient kinetic energy to said fuel to move said fuel to said ignition point at the time of ignition by deflecting it about the perimeter of said chamber.

28. An internal combustion engine comprising means providing a combustion chamber, means forming a cylinder, passage means providing an opening for admitting compressed air and fuel to said chamber, means providing an opening for admitting to said cylinder at part load of the engine a restricted quantity of combustion air, means providing timed electrical ignition in the chamber, means located on said cylinder and directed towards said passage and chamber for injecting at high velocity atomized fuel at part load into a part of said combustion air to form a localized combustible fuel-air mixture and means associated with said injection means for imparting to said fuel sufficient kinetic energy to move said fuel-air mixture to the vicinity of said ignition means at the time of ignition.

29. An internal combustion engine comprising means providing a combustion chamber, means forming a cylinder, passage means providing an opening for admitting compressed air and fuel to said chamber, means providing an opening for admitting to said cylinder at part load of the engine a restricted quantity of combustion air, means providing timed electrical ignition in the chamber, means for injecting variable quantities of atomized fuel in proportion to engine load at least partly across said cylinder into said chamber to form at part load a combustible fuel-air mixture with a portion of said combustion air and means associated with said fuel injection means for imparting to said fuel sufficient kinetic energy to move said fuel-air mixture to the vicinity of said ignition means at the time of ignition the said restricted quantity of air being controlled simultaneously with operation of the fuel operating means.

30. An internal combustion engine comprising means providing a combustion chamber, means forming a cylinder, passage means providing an opening for admitting compressed air and fuel to said chamber, means providing an opening for admitting to said cylinder at part load of the engine a restricted quantity of combustion air, means providing timed electrical ignition in said chamber, means for injecting variable quantities of atomized fuel in proportion to engine load at least partly across said cylinder into said chamber to form at part load a combustible fuel-air mixture with part of said combustion air, means associated with said fuel injection means for imparting to said fuel sufficient kinetic energy to move said fuel-air mixture to the vicinity of said ignition means at the time f ignition, and means for progressively increasing the fuel-air ratio of said combustible mixture and the ratio of the total amount of air and fuel admitted to said cylinder and chamber, while progressively decreasing the engine load beginning at a predetermined value of part load the said air restricting means being operated simultaneously with operation of the fuel control means.

31. An internal combustion engine comprising means providing a combustion chamber, means forming a cylinder, passage means providing an opening for admitting compressed air and fuel to said chamber, means providing an opening for admitting to said cylinder at part load of the engine a restricted quantity of combustion air, means providing timed electrical ignition in said chamber, means for injecting atomized fuel at least partly across said cylinder into said chamber to form at part load a combustible fuel-air mixture with part of said combustion air, means associated with said fuel injection means for imparting to said fuel sufficient kinetic energy to move said fuel-air mixture to the vicinity of said ignition point at the time of ignition, means for varying the quantity of fuel injected, and means operated simultaneously with actuation of the means for varying the quantity of fuel injected for progressively increasing the fuel-air ratio of said combustible mixture and the ratio of the total amount of air and fuel admitted to said cylinder and chamber when progressively decreasing the engine load and speed beginning at a predetermined value of engine speed and load.

32. In an internal combustion engine, an engine cylinder, a cylinder head having an inner face extending across one end of said cylinder, a piston operating in said cylinder, walls forming a combustion chamber in the shape of a body of revolution closely adjacent and entirely at one side of the cylinder, and walls forming a passageway extending and communicating between said cylinder and chamber and said passageway having one face arranged tangentially to the curved wall of said chamber, a wall within said cylinder-head arranged to isolate a portion of the walls of said chamber from the cooling fluid used for cooling the engine, a fuel injection nozzle positioned on said cylinder and opposite said passage and one or more spray orifices in said nozzle directed into said passage and towards said curved chamber wall, electrical ignition means in said chamber, means forming an opening for the admission of combustion air to said cylinder and said chamber, valve means for exhausting combustion gases from said cylinder and chamber said valve means serving also to retain heat in said chamber, a manifold connected to said opening for the admission of air, an air throttling valve, tending to move into open position by means of a spring, arranged in said manifold, a fuel injection pump embodying means for regulating the quantity of fuel delivered to said fuel injection nozzle, a connecting link pivotally attached at one end to said fuel regulating means and having a lost motion connection at the other end to said throttling valve in such a manner as to actuate said throttling valve only by moving said fuel regulating means from approximately one fourth full load position to slow speed idling position.

33. In an internal combustion engine having a combustion chamber substantially divided from the engine cylinder by means of a passage, said passage arranged tangentially with respect to said chamber, and said chamber formed as a body of revolution, timed injection means located on said cylinder and substantially opposite said passage and directed towards said passage, timed ignition means in said chamber, said ignition means being timed to ignite at a point of the engine cycle substantially ahead of top dead center position, the method of forming and burning a combustible fuel charge at full load and nearly full load operating condition of the engine which comprises providing an air charge in said cylinder and chamber, injecting during the compression stroke atomized fuel at high velocity at least partly across said cylinder into said chamber to form with all the air in said chamber at the time of ignition an overrich combustible fuel-air mixture terminating the injection interval before the end of the compression stroke, igniting said mixture and thereafter delivering additional air into said chamber to complete combustion of said fuel charge.

34. The method of forming and burning a combustible fuel charge in an internal combustion engine employing a timed ignition system having a local point of ignition located in the combustion space, which comprises providing a confined atmosphere of air consisting of a fixed and a variable volumetric portion, said fixed portion forming the combustion space, compressing said air into said fixed portion, impregnating a portion of said air to form a combustible fuel cloud and moving said cloud to the vicinity of said ignition point by injecting during the compression stroke atomized fuel at high velocity through a part of said variable portion into said fixed portion and igniting said fuel cloud when it is in the vicinity of said ignition point.

35. In an internal combustion engine, means for forming a fuel charge comprising a fuel spray nozzle, a combustion chamber, a cylinder bore between said fuel nozzle and said combustion chamber, and passage means between said chamber and said cylinder bore whereby the fuel sprayed from said nozzle will be sprayed across the upper part of said cylinder and will pass unrestricted through said passage into said combustion chamber.

36. In an internal combustion engine, means for forming a fuel charge comprising a fuel spray nozzle, a combustion chamber, a cylinder bore between said fuel nozzle and said combustion chamber and passage means between said chamber and cylinderbore whereby the fuel sprayed from said nozzle will be sprayed across at least part of said cylinder and will pass unrestricted through said passage into said combustion chamber, ignition means for igniting the fuel charge in said combustion chamber, and means for supplying free air to the combustion chamber after ignition of said charge.

37. In an internal combustion engine, means for forming a combustion charge comprising a chamber adapted to receive the engine piston upon the compression stroke, a fuel nozzle positioned adjacent and arranged to project a fuel cloud across said chamber, means for supplying fuel under pressure to said nozzle, a combustion chamber positioned adjacent said first named chamber and substantially opposite said fuel nozzle, passage means between said combustion chamber and said first named chamber, said passage means having sufficient cross-sectional area to permit unrestricted entry of a fuel cloud produced by said injection means into said combustion chamber and inlet and outlet valves and ignition means in said chamber.

38. In an internal combustion engine, a cylinder and a piston arranged therein, means forming a combustion chamber in the shape of a body of revolution, means forming a passage between said chamber and said cylinder, said passage being arranged with respect to said chamber to introduce air into and cause rotation thereof in said chamber about the axis of said chamber during the compression stroke, means for injecting atomized fuel across or partly across said cylinder through said passage into said chamber to form while traveling through the air in said cylinder, and when entraining with a portion of the air flowing through said passage, a fuel cloud of predetermined dimensions, ignition means located in said chamber, said ignition means being employed to ignite said fuel cloud upon movement thereof to the vicinity of the ignition means due to the kinetic energy imparted to said fuel by said injection means.

39. In an internal combustion engine with timed fuel injection and artificial ignition comprising a cylinder and a piston arranged to reciprocate in said cylinder, the combination of a fuel injector arranged on the cylinder and a nonobstructing mixing passage arranged opposite the fuel injector and adjacent said cylinder, with a combustion chamber arranged on the cylinder and in communication with said mixing passage, said injector being arranged to project a fuel charge across said cylinder and into said chamber, and the mixing passage being proportioned to permit free passage of said fuel charge into said chamber.

40. An internal combustion engine comprising a combustion chamber and ignition means arranged therein, means to form a combustible fuel-air mixture in the form of a fuel cloud within said engine but outside said combustion chamber during the latter part of the compression stroke of the engine, and to move said fuel cloud into said chamber and into the vicinity of said ignition means and maintaining the fuel air ratio of said fuel cloud substantially the same until ignition occurs.

41. In an internal combustion engine with timed fuel injection and artificial ignition comprising a cylinder and a piston arranged to reciprocate in said cylinder, the combination of a fuel injector arranged on the cylinder and a nonobstructing mixing passage arranged opposite the fuel injector and adjacent said cylinder with a combustion chamber arranged on the cylinder and in communication with said mixing passage, said injector being arranged to project a fuel charge across said cylinder and into said chamber, and said mixing passage arranged with respect to said cylinder to be partly closed by said piston during the last part of the compression stroke, said mixing passage permitting unobstructed travel of said fuel charge into said chamber.

42. In an internal combustion engine, a cylinder block, a cylinder and inlet and exhaust valves in said block, said valves arranged side by side and parallel or nearly parallel to the axis of said cylinder, a cylinder head, a first cavity in said head formed as a continuation of said cylinder, a second cavity in said head formed substantially as two adjacent bodies of rotation about the axis of said valves, two separate passages between said first cavity and said second cavity, a fuel nozzle arranged adjacent said first cavity and substantially opposite said second cavity and adapted to direct two jets of fuel across or partly across said first cavity to pass through said passages and to enter said bodies of revolution tangentially and a piston in said cylinder adapted to displace the air in said cylinder and said first cavity into said second cavity during the compression stroke of the engine and to progressively reduce the cross-sectional area of said passages during the latter part of the compression stroke, and ignition means located in said second cavity.

43. In an internal combustion engine of L-head construction, employing timed fuel injection and artificial ignition, a combustion chamber in the shape of two adjacent bodies of revolution formed about the inlet and exhaust valves and two separate passages between the engine cylinder and the combustion chamber arranged tangentially with respect to the bodies of revolution, and a fuel injection nozzle arranged on the engine cylinder opposite said passages, said nozzle being provided with orifices directed to project fuel charges through said passages into said chamber.

44. In an internal combustion engine, a cylinder and a piston arranged therein, means forming a combustion chamber in the shape of a body of revolution, means forming a passage between said chamber and said cylinder, said passage being arranged with respect to said chamber to introduce air into and cause rotation thereof in said chamber about the axis of said chamber during the compression stroke, means for injecting atomized fuel across or partly across said cylinder through said passage into said chamber to form while traveling through the air in said cylinder, and when entraining with a portion of the air flowing through said passage, a fuel cloud of predetermined dimensions, ignition means located in said chamber, said ignition means being employed to ignite said fuel cloud upon movement thereof to the vicinity of the ignition means due partly to the kinetic energy imparted to said fuel by said injection means and partly due to said air moving in the direction of said fuel cloud.

45. An internal combustion engine with timed fuel injection and artificial ignition, comprising a cylinder block, a cylinder and inlet and exhaust valves in said block, said valves arranged side by side and parallel or nearly parallel to the axis of said cylinder, a cylinder head, a first cavity in said head formed above said cylinder, a second cavity in said head formed substantially as two adjacent bodies of rotation about the axis of said valves, a passage between said first cavity and said second cavity, said passage being centered towards the apex formed by the two adjoining bodies of rotation, a fuel nozzle arranged adjacent said first cavity and substantially opposite said apex of said second cavity and adapted to direct a jet of fuel across or partly across said first cavity to pass through said passage towards said apex, a piston in said cylinder and ignition means positioned in the path of travel of the fuel jet sprayed from said fuel nozzle.

46. In an internal combustion engine, a combustion chamber having imperforate walls and ignition means therein, and means to form a combustible fuel-air mixture in the form of a fuel cloud within the working cylinder but outside said combustion chamber and to move said fuel cloud into said chamber and into the vicinity of said ignition means.

47. An internal combustion engine, comprising a cylinder-block, a cylinder and inlet and exhaust valves in said block, said valves arranged side by side and parallel or nearly parallel to the axis of the cylinder, a cylinder head, a fuel nozzle in said head adjacent said cylinder and substantially opposite said valves, a combustion chamber in said head formed substantially as two bodies of rotation about the axis of the valves, two separate channels in said head beginning at said nozzle and leading into said bodies of rotation tangentially, the combined cross sectional area of the portions of said channels connecting said cylinder with said chamber being large enough to permit unrestricted admission of air into and expulsion of exhaust gases out of said cylinder and the contour of said channels shaped as portions of a cone, the size of said cone being substantially the same as the size of the cone formed by fuel jets emerging from said nozzle, and ignition means in said chamber.

48. An internal combustion engine comprising a cylinder-block, having a cylinder and a piston arranged in said cylinder, inlet and exhaust valves in said block, parallel or nearly parallel to the axis of said cylinder and on each side of said cylinder, a cylinder head, a central cavity in said head formed as a continuation of said cylinder and adapted to receive said piston at the end of the upstroke, two combustion chambers formed as bodies of rotation about the axis of said valves, separate passages leading tangentially into said chambers from said central cavity, a fuel nozzle in or near the center of said head adapted to inject fuel jets partly across said cylinder through said passages into said chambers and ignition means in said chambers.

49. An internal combustion engine comprising a cylinder and a piston arranged therein, a combustion chamber of substantially spherical shape arranged adjacent said cylinder and laterally at the upper end thereof, a passage between said chamber and said cylinder, entering said chamber tangentially, a fuel nozzle arranged on said cylinder and substantially opposite said chamber and in line with said passage, said piston adapted to progressively reduce the cross sectional area of said passage during the latter part of the compression stroke and ignition means in said chamber.

50. In an internal combustion engine having a cylinder, a combustion chamber with curved peripheral wall, a passage arranged tangentially with respect to said chamber wall and interconnecting said cylinder and chamber, timed injection means on said cylinder positioned to direct a spray of fuel across at least part of said cylinder through said passage to be deflected about said peripheral wall and timed ignition means in said chamber positioned in the path of said fuel spray, the method of forming and burning a combustible fuel-air mixture which comprises injecting atomized fuel at high velocity through a body of hot air contained in said cylinder into said chamber to begin vaporization of said fuel prior to its entry into said chamber and to move said fuel to the vicinity of said ignition means whereby the fuel will not stick to the chamber walls and igniting said fuel when it is at said ignition point.

ALBERT T. BREMSER.